(12) United States Patent
Cairns et al.

(10) Patent No.: US 7,769,078 B2
(45) Date of Patent: Aug. 3, 2010

(54) APPARATUS, METHODS AND COMPUTER PROGRAM PRODUCTS FOR DELAY SELECTION IN A SPREAD-SPECTRUM RECEIVER

(75) Inventors: Douglas Cairns, Durham, NC (US); Ali S. Khayrallah, Cary, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1680 days.

(21) Appl. No.: 10/959,923

(22) Filed: Oct. 6, 2004

(65) Prior Publication Data

US 2005/0078742 A1   Apr. 14, 2005

Related U.S. Application Data

(63) Continuation-in-part of application No. 09/845,950, filed on Apr. 30, 2001, now Pat. No. 6,922,434.

(60) Provisional application No. 60/257,439, filed on Dec. 22, 2000.

(51) Int. Cl.
*H04B 1/00* (2006.01)
(52) U.S. Cl. .............. 375/147; 375/148; 375/149; 375/150; 375/152; 375/316; 375/343; 375/367; 375/346; 375/349; 375/350
(58) Field of Classification Search ........... 375/147, 375/148, 149, 150, 152, 316, 343, 367, 346, 375/349, 350
See application file for complete search history.

(56) References Cited

U.S. PATENT DOCUMENTS

| | | | |
|---|---|---|---|
| 5,530,716 A | 6/1996 | Lipa | |
| 5,572,552 A | 11/1996 | Dent et al. | |
| 5,615,209 A | 3/1997 | Bottomley | |
| 5,671,221 A * | 9/1997 | Yang | ............ 370/320 |
| 5,673,291 A | 9/1997 | Dent | |

(Continued)

FOREIGN PATENT DOCUMENTS

EP   0 749 215 A   12/1996

(Continued)

OTHER PUBLICATIONS

Essam Sourour, Gregory Bottomley, Rajaram Ramesh, "Delay tracking for direct sequence spread spectrum systems in multipath fading channels", 1999, IEEE 0-7803-5565-2/99.*

(Continued)

*Primary Examiner*—Chieh M Fan
*Assistant Examiner*—Siu M Lee
(74) *Attorney, Agent, or Firm*—Coats & Bennett, P.L.L.C.

(57) ABSTRACT

Channel and correlation characteristics are determined for a composite signal. Respective combining weights for information from the composite signal are determined for respective ones of a plurality of candidate delays based on the determined channel and correlation characteristics. A group of delays, e.g., RAKE correlator delays or chip equalizer filter taps, is selected from the plurality of candidate delays based on the determined weights. Information from the composite signal for the selected delays is processed according to a spreading code to generate a symbol estimate. The invention may be embodied as methods, apparatus and computer program products.

43 Claims, 15 Drawing Sheets

U.S. PATENT DOCUMENTS

| | | | |
|---|---|---|---|
| 5,796,788 A * | 8/1998 | Bottomley | 375/341 |
| 5,852,630 A * | 12/1998 | Langberg et al. | 375/219 |
| 5,949,816 A | 9/1999 | Okamoto | |
| 5,973,642 A | 10/1999 | Li et al. | |
| 5,987,016 A | 11/1999 | He | |
| 6,052,406 A | 4/2000 | Epstein et al. | |
| 6,125,137 A | 9/2000 | Wang et al. | |
| 6,154,487 A | 11/2000 | Murai et al. | |
| 6,157,687 A | 12/2000 | Ono | |
| 6,160,841 A | 12/2000 | Stansell et al. | |
| 6,275,186 B1 | 8/2001 | Kong | |
| 6,275,483 B1 * | 8/2001 | Papasakellariou et al. | 370/335 |
| 6,347,234 B1 | 2/2002 | Scherzer | |
| 6,363,350 B1 * | 3/2002 | Lafe | 704/500 |
| 6,377,615 B1 | 4/2002 | Sourour et al. | |
| 6,459,883 B2 | 10/2002 | Subramanian et al. | |
| 6,507,605 B1 | 1/2003 | Fukumoto et al. | |
| 6,529,545 B2 | 3/2003 | Tiirola et al. | |
| 6,567,462 B1 | 5/2003 | Brunner et al. | |
| 6,615,024 B1 * | 9/2003 | Boros et al. | 455/67.14 |
| 6,628,698 B1 | 9/2003 | Oda | |
| 6,636,561 B1 | 10/2003 | Hudson | |
| 6,658,046 B1 | 12/2003 | Miura | |
| 6,683,924 B1 | 1/2004 | Ottosson et al. | |
| 6,700,880 B2 | 3/2004 | Ling | |
| 6,985,518 B2 * | 1/2006 | Nielsen | 375/152 |
| 6,996,160 B2 * | 2/2006 | Li et al. | 375/148 |
| 7,031,373 B1 * | 4/2006 | Iyer | 375/148 |
| 2001/0028677 A1 | 10/2001 | Wang et al. | |
| 2002/0061053 A1 | 5/2002 | Kim et al. | |
| 2002/0080863 A1 | 6/2002 | Nielsen | |
| 2002/0122470 A1 | 9/2002 | Heikkila | |
| 2002/0163956 A1 | 11/2002 | Seo et al. | |
| 2003/0003890 A1 | 1/2003 | Tanaka | |
| 2003/0007548 A1 | 1/2003 | Nagano | |
| 2003/0021337 A1 | 1/2003 | Moshavi et al. | |
| 2003/0095530 A1 | 5/2003 | Lin | |
| 2003/0112776 A1 | 6/2003 | Brown et al. | |
| 2003/0117970 A1 | 6/2003 | Kondo | |
| 2003/0228887 A1 | 12/2003 | Kishigami et al. | |
| 2004/0066841 A1 | 4/2004 | Jonsson | |
| 2004/0156386 A1 * | 8/2004 | Atarashi et al. | 370/441 |
| 2005/0078742 A1 | 4/2005 | Cairns et al. | |
| 2005/0130616 A1 * | 6/2005 | Khayrallah et al. | 455/242.2 |
| 2005/0152486 A1 | 7/2005 | Wang | |
| 2005/0201499 A1 * | 9/2005 | Jonsson | 375/348 |
| 2006/0109892 A1 * | 5/2006 | Li et al. | 375/148 |
| 2008/0089403 A1 * | 4/2008 | Hooli et al. | 375/232 |

FOREIGN PATENT DOCUMENTS

| | | |
|---|---|---|
| EP | 0 825 727 A | 2/1998 |
| EP | 0 896 438 A1 | 2/1999 |
| EP | 1 063 781 A1 | 12/2000 |
| EP | 1 162 756 A2 | 12/2001 |
| EP | 1 351 405 A1 | 10/2003 |
| EP | 1 359 684 A1 | 11/2003 |
| EP | 1 372 269 A1 | 12/2003 |
| EP | 1 138 126 B1 | 3/2004 |
| WO | WO96/10873 | 4/1996 |
| WO | WO99/35763 | 7/1999 |
| WO | WO01/01594 A1 | 1/2001 |
| WO | WO01/13530 A1 | 2/2001 |
| WO | WO01/45295 A2 | 6/2001 |
| WO | WO02/15427 A2 | 2/2002 |
| WO | WO02/29996 A2 | 4/2002 |
| WO | WO02/052743 A2 | 7/2002 |
| WO | WO03/096564 A1 | 11/2003 |
| WO | WO03/107555 A1 | 12/2003 |
| WO | WO2004/017534 A1 | 2/2004 |

OTHER PUBLICATIONS

Gregory E. Bottomley, Tony Ottosson, Yi-Pin Eric Wang, "A generalized RAKE reciever for interference Suppression", Aug. 2000, IEEE 0733-8716/00.*

Yi-Pin Eric Wang, Gregory E. Bottomley, "Generlized RAKE reception for cancelling interference for multipath base stations", Sep. 24-28, 2000, IEEE 0-7803-6507-0/00.*

Gregory E. Bottomley, Tony Ottosson, and Yi-Pin Eric Wang, "A generalized rake reciever for DS-CDMA systems", May 15-18, 2000, IEEE 0-7803-5718-3/00.*

Hafez Hadinejad-Mahram, "On the equivalence of linear MMSE chip-level equalizer and generalized rake", Jan. 2004, IEEE 1089-7798/04.*

Adachi et al. "Wideband DS-CDMA for Next-Generation Mobile Communications Systems." *IEEE Communications Magazine.* Sep. 1998, pp. 56-59.

Barbosa et al., "Adaptive Detection of DS/CDMA Signals in Fading Channels." *IEEE Trans. Commun.* vol. 46, Jan. 1998, pp. 115-124.

Bottomley et al. "A Generalized RAKE Receiver for Interference Suppression" IEEE Journal Communications, vol. 18, No. 8, Aug. 2000.

Bottomley et al. "Adaptive Arrays and MLSE Equalization." Proc. 1995 IEEE 45th Vehicular Technology Conference (VTC 95). Chicago, Jul. 25-28, 1995, 5 pp.

Bottomley. "Optimizing the Rake Receiver for the CDMA Downlink." Proceedings of the 43rd IEEE—Vehicular Technology Conference. Secaucus, NJ, May 18-20, 1993.

Dahlman et al. "UMTS/IMT-2000 Based on Wideband CDMA." *IEEE Communications Magazine.* Sep. 1998, pp. 70-80.

Davis et al. "A Noise Whitening Approach to Multiple-Access Noise Rejection—Part II: Implementation Issues." *IEEE Journal on Selected Areas in Communications.* vol. 14, Oct. 1996, pp. 1488-1499.

Dent et al. "CDMA-IC: A Novel Code Division Multiple Access Scheme Based on Interference Cancellation." in Proc. PIMRC. Boston, MA, Oct. 1992 pp. 4.1.1-4.1.5.

Dinan et al., "Spreading Codes for Direct Sequence CDMA and Wideband CDMA Cellular Networks." *IEEE Communications Magazine.* Sep. 1998, pp. 48-54.

Duel-Hallen et al. "Multiuser Detection of CDMA Systems." *IEEE Personal Communications Magazine.* vol. 2, Apr. 1995, pp. 46-58.

European Patent Office Standard Search Report, U.S. Appl. No. 09/845,950, filed Nov. 20, 2001.

Ewerbring et al. "CDMA with Interference Cancellation: A Technique for High Capacity Wireless Systems." In Proc. IEEE Int. Conf. Commun., Geneva, Switzerland, 1993.

Gumas. "A Century Old, the Fast Hadamard Tranform Proves Useful in Digital Communications." *Personal Engineering.* Nov. 1997, pp. 57-63.

Harris et al. "Handbook of Mathematics and Computer Science," New York, Springer-Verlag, 1998.

Harris et al. *Handbook of Mathematics and Computer Science.* Springer-Verlag Publishing, New York, 1998, pp. 456-457.

Hottinen et al. "Multi-User Detection for Multi-Rate CDMA Communications," in Proc. IEEE Int. Conf. Commun. Dallas, TX, Jun. 24-28, 1996.

International Search Report, PCT/US00/23297, Dec. 28, 2000.

International Search Report, PCT/US01/49268, Jun. 26, 2002.

Jamal et al. "Adaptive MLSE Performance on the D-AMPS 1900 Channel." *IEEE Transactions on Vehicular Technology.* vol. 46, Aug. 1997, pp. 634-641.

Juntti, M.J. "Multi-User Detector Performance Comparisons in Multi-Rate CDMA Systems." in Proc. IEEE VTC '98. Ottawa, Canada, May 1998, pp. 31-35.

Juntti, M.J. "System Concept Comparisons for Multi-Rate CDMA Systems with Multi-User Detection." in Proc. IEEE VTC '98, Ottawa, Canada May 1998, pp. 36-40.

Kim et al., "Minimum Selection GSC and Adaptive Low-Power Rake Combining Scheme," International Symposium on Circuits and Systems, Bangkok, Thailand, May 2003, pp. 357-360.

Klein et al., "Rake Reception for UWB Communication Systems with Intersymbol Interference," in Proc. the 4th IEEE Signal Processing Workshop on Signal Processing Advances in Wireless Communications (SPAWC), Rome, Italy, Jun. 2003.

Kohno et al. "Combination of an Adaptive Array Antenna and Canceller of Interference for Direct-Sequence Spread-Spectrum Multiple-Access System." *IEEE Journal on Selected Areas in Communication.* vol. 8, No. 4, May 1990.

Krauss et al, "Downlink Specific Linear Equalization for Frequency Selective CDMA Cellular Systems," Journal of VLSI Signal Processing, vol. 30, 2002, pp. 143-161.

Liu et al. "Blind Equalization in Antenna Array CDMA Systems." *IEEE Trans. Sig. Proc.* vol. 45, Jan. 1997, pp. 161-172.

Madhow et al. "MMSE Interference Suppression for Direct-Sequence Spread-Spectrum Communication." *IEEE Trans. Commun.* vol. 42, Dec. 1994, pp. 3178-3188.

Madkour et al. "Multi-Rate Multi-Code CDMA Using FWT for Mobile and Personal Communications." Proceedings of the Ninth IEEE International Symposium on Personal, Indoor and Mobile Radio Communications. The Marriott Copley Place, Boston, MA, Sep. 8-11, 1998.

Mailaender et al. "Linear Single-User Detectors for Asynchronous and Quasi-Synchronous CDMA." in Proc. 29th Annual Conference on Info. Sciences and Systems (CISS '95), Johns Hopkins University, 1995, pp. 199-204.

Monk et al. "A Noise Whitening Approach to Multiple Access Noise Rejection—Part I: Theory and Background." *IEEE Journal on Selected Areas in Communications.* vol. 12, Jun. 1994, pp. 817-827.

Muszynski, P. "Interference Rejection Rake-Combining for WCDMA." First Intl. Symposium Wireless Personal Multimedia (WPMC '98). Yokosuka, Japan, pp. 93-98, Nov. 4-6, 1998.

Naguib et al. "Performance of CDMA Cellular Networks with Base-Station Antenna Arrays." Presented at the 1994 International Zurich Seminar on Digital Communications (no date).

Ng et al. "A Structured Channel Estimator for Maximum-Likelihood Sequence Detection." *IEEE Commun. Letters.* vol. 1, Mar. 1997, pp. 52-55.

Ojanpera et al. "Qualitative Comparison of Some Multi-User Detector Algorithms for Wideband CDMA." in Proc. IEEE VTC '98. pp. 46-50, Ottawa, Canada, May 1998.

Patel et al. "Analysis of a DS/CDMA Successive Interference Cancellation Scheme in DS/CDMA System using Correlations." in Proc. GLOBECOM, Houston, TX, pp. 76-80, 1993.

Patel et al.. "Analysis of a Simple Successive Interference Cancellation Scheme in DS/CDMA System." IEEE JSAC, vol. 12, No. 5, pp. 796-807, Jun. 1994.

Pateros et al. "An Adaptive Correlator Receiver for Direct-Sequence-Spread-Spectrum Communication." *IEEE Trans. Commun.* vol. 44, Nov. 1996, pp. 1543-1552.

Peterson et al. "Introduction to Spread-Spectrum Communications." Prentice Hall International, Inc. 1995, pp. 540-547.

Picinbono, B. "On Circularity." *IEEE Trans. Sig. Proc.* vol. 42, Dec. 1994, pp. 3473-3482.

Picinbono, B. "Second-Order Complex Random Vectors and Normal Distributions." *IEEE Trans. Sig. Proc.* vol. 44, Oct. 1996, pp. 2637-2640.

Search Report for "Combining finger selection in a generalized Rake receiver," World Patent Technology, Apr. 8, 2004.

Wang et al. "Blind-Multi-User Detection: A Subspace Approach," IEEE Trans. Info. Theory, vol. 44, No. 2, Mar. 1998, pp. 677-690.

Wang et al. "Generalized RAKE Reception for Cancelling Interference from Multiple Base Stations", Proceedings of IEEE VTS Vehicular Technology Conference, Fall, 2000, Boston.

Wong et al. "A Linear Receiver for Direct-Sequence Spread-Spectrum Multiple-Access Systems with Antenna Arrays and Blind Adaptation" IEEE Transactions Information Theory, vol. 44, No. 2, Mar. 1998.

Yoon et al. "A Spread-Spectrum Multiaccess System with Cochannel Interference Cancellation for Multipath Fading Channels." *IEEE J. Select. Areas in Commun.* vol. 11, No. 7, Sep. 1993, pp. 1067-1075.

Yoon et al. "Matched Filtering in Improper Complex Noise and Applications to DS-CDMA," Sixth IEEE Intl. Symp. Personal, Indoor, Mobile Radio Commun. (PIMRC '95), Toronto, Sep. 27-29, 1995.

Lee et al., "Design of Nonuniformly Spaced Tapped-Delay-Line Equalizers for Sparse Multipath Channels," IEEE Transactions on Communications, vol. 52, No. 4, Apr. 2004, pp. 530-535.

Lee et al., "Design of Nonuniformly-Spaced Tapped-Delay-Line Equalizers for Sparse Multipath Channels," Proc. IEEE Global Telecommun. Conf. (GLOBECOME), San Antonio, TX, Nov. 25-29, 2001, vol. 2, pp. 1336-1343.

Knoche et al., "MUI-Suppression with Reduced T-Equalizer for UTRA FDD Downlink," 2004 Vehicular Technology Conference (Fall), Sep. 26-29, 2004, Los Angeles, pp. 1688-1692.

Yoon et al. "Matched Filters with Interference Suppression Capabilities for DS-CDMA," *IEEE J. Select. Areas in Commun.* vol. 14, October 1996, pp. 1510-5121.

Yoon et al. "Maximizing SNR in Improper Complex Noise and Applications to CDMA." *IEEE Commun. Letters,* vol. 1, January 1997, pp. 5-8.

Zvonar et al. "Sub-Optimal Multi-User Detector for Frequency Selective Rayleigh Fading Synchronous CDMA Channels." *IEEE Trans. Commun.* vol. 43, No. 2-4, Feb.-Apr. 1995, pp. 154-157.

Co-pending U.S. Appl. No. 11/566,820, filed Dec. 5, 2006.
Co-pending U.S. Appl. No. 11/566,256, filed Dec. 4, 2006.
Co-pending U.S. Appl. No. 11/751,109, filed May 21, 2007.
Co-pending U.S. Appl. No. 11/935,840, filed Nov. 7, 2007.

Cotter, S. F. et al. "Efficient Backward Elimination Algorithm for Sparse Signal Representation Using Overcomplete Dictionaries." IEEE Signal Processing Letters, vol. 9, No. 5, May 2002, pp. 145-147.

Kutz, G. et al. "Determination of Tap Positions for Sparse Equalizers." IEEE Transactions on Communications, vol. 5, No. 9, Sep. 2007, pp. 1712-1724.

Cotter, S. F. et al. "Backward Sequential Elimination for Sparse Vector Subset Selection." (Abstract only). Signal Processing, vol. 81, No. 9, Sep. 2001, pp. 1849-1864.

* cited by examiner

APPARATUS, METHODS AND COMPUTER PROGRAM PRODUCTS FOR DELAY SELECTION IN A SPREAD-SPECTRUM RECEIVER

RELATED APPLICATION

The present application is a continuation-in-part of U. S. patent application Ser. No. 09/845,950, filed Apr. 30, 2001 now U.S. Pat. No. 6,922,434, which claims priority to U.S. Provisional Application Ser. No. 60/257,439, filed Dec. 22, 2000. The disclosures of the aforementioned U.S. patent application Ser. No. 09/845,950, and U.S. Provisional Application Ser. No. 60/257,439 are incorporated herein by reference in their entireties.

BACKGROUND OF THE INVENTION

The present invention relates to radio communications, and more particularly, to apparatus, methods and computer program products for processing spread spectrum communications signals.

Spread spectrum signal transmission techniques are widely used in communications systems, such as code division multiple access (CDMA) cellular telephone networks. Referring to FIG. 1, an information symbol is typically modulated by a spreading sequence before transmission from a transmitting station 110 such that the symbol is represented by a number of chips in the transmitted signal. At the receiver 120, the received signal is despread using a despreading code, which is typically the conjugate of the spreading code. The receiver 120 including a radio processor 122 that performs downconversion, filtering and/or other operations to produce a baseband signal that is provided to a baseband processor 124. The baseband processor 124 despreads the baseband signal to produce symbol estimates that are provided to an additional processor 126, which may perform additional signal processing operations, such as error correction decoding.

In coherent direct-sequence CDMA (DS-CDMA) systems, coherent RAKE reception is commonly used. This type of receiver despreads the received signal by correlating to the chip sequence to produce despread values that are weightedly combined according to estimated channel coefficients. The weighting can remove the phase rotation of the channel and scale the despread values to provide "soft" values that are indicative of the transmitted symbols.

Multipath propagation of the transmitted signal can lead to time dispersion, which causes multiple resolvable echoes of the transmitted signal to arrive at the receiver. In a conventional RAKE receiver, correlators are typically aligned with selected echoes of the desired signal. Each correlator produces despread values that are weightedly combined as described above. Although a RAKE receiver can be effective in certain circumstances, self and multi-user interference can degrade performance by causing loss of orthogonality between spreading-sequence defined channels.

A "generalized" RAKE (G-RAKE) receiver has been proposed to provide improved performance in such interference environments. A conventional G-RAKE receiver typically uses combining weights that are a function of channel coefficients and a noise covariance that includes information relating to the interfering signals. These weights w may be expressed as:

$$w = R^{-1}c, \quad (1)$$

where R is a noise covariance matrix and c is a channel coefficient vector.

A typical baseband processor for a G-RAKE receiver is illustrated in FIG. 2. Chip samples are provided to a finger placement unit 230, which determines where to place fingers (selecting delays for one or more antennas) by a correlation unit 210. The correlation unit 210 despreads one or more traffic channels and produces traffic despread values. The selected paths are also provided to a weight computer 240, which computes combining weights that are used to combine the despread values in a combiner 220 to produce soft values.

Similar functionality may be provided using a chip equalizer structure, as shown in FIG. 3. In such a structure, chip samples are provided to a tap placement unit 330, which determines where to place filter taps (i.e., which delays for one or more antennas) for a finite impulse response (FIR) filter 310. The selected tap locations are also provided to a weight calculator 340 that computes filter coefficients (or weights) for the filter 310. The filter 310 filters the chip samples to produce a signal that is despread by a correlator 320 to produce symbol estimates.

A conventional weight computer for a G-RAKE receiver is illustrated in FIG. 4. Signal samples are provided to a correlation unit 410 that despreads symbols from a pilot or traffic channel to produce initial despread values. Symbol modulation is removed from these values by a modulation remover 420, and the resulting values are provided to a channel tracker 430 that generates channel estimates. The despread values and channel estimates are provided to a noise covariance estimator 450, which produces an estimate of the noise covariance of the set of delays in use. The channel estimates and noise covariance estimate are provided to a weight calculator 440, which computes combining weights (filter coefficients) therefrom.

A G-RAKE receiver differs from a traditional RAKE receiver in that it considers delays in addition to those corresponding to echoes of the desired signal. These other delays are typically chosen to provide information about interference so that the receiver may suppress the interference.

In a practical RAKE receiver (traditional RAKE or G-RAKE), hardware and/or software constraints typically limit the number of "fingers" that can be used at any given time. In a traditional RAKE receiver, these fingers are typically chosen such that a maximum amount of the desired signal's energy is collected. In a G-RAKE receiver, however, the finger selection criteria also may collect interference signal information such that a desired amount of interference suppression can be achieved.

A variety of strategies for selecting fingers for RAKE receivers have been proposed. U.S. Pat. No. 5,572,552 to Dent et al. describes a process whereby fingers are placed according to a signal to noise ratio (SNR) metric that is computed as a function of channel coefficients, power levels and, optionally, the spreading code. U.S. Pat. No. 6,363,104 to Bottomley describes estimating SNR for different combinations of finger positions as a function of channel estimates and impairment correlation matrix estimates for each candidate combination, and selecting a finger combination that maximizes SNR. U.S. Pat. No. 6,683,924 to Ottosson et al. describes a finger selection process based on time differentials and relative signals strengths of signal paths. "Low complexity implementation of a downlink CDMA generalized RAKE receiver," and "On the performance of a practical downlink CDMA generalized RAKE receiver," by Kutz et al.,

*Proc. IEEE Veh. Technol. Conf.*, Vancouver, Canada (Sep. 24-28, 2002), describe other selection techniques.

SUMMARY OF THE INVENTION

According to some embodiments of the present invention, methods are provided for recovering a signal from a composite signal including signals from one or more sources. Channel and correlation characteristics are determined for the composite signal. Respective combining weights for information from the composite signal are determined for respective ones of a plurality of candidate delays based on the determined channel and correlation characteristics. A group of delays, e.g., RAKE correlator delays or chip equalizer filter taps, is selected from the plurality of candidate delays based on the determined weights. Information from the composite signal for the selected delays is processed according to a spreading code to generate a symbol estimate.

In some embodiments of the present invention, a time-domain channel response and quantity correlation may be determined and the respective weights determined from the time-domain channel response and quantity correlation. The quantity correlation may be a noise covariance. The selected group of delays may include a group of delays, e.g. correlator delays or chip equalizer filter taps, having greatest associated weights.

In further embodiments of the present invention, a frequency domain approach may be used to determine weights for correlator delays and/or chip equalizer filter taps. A weight frequency response including noise information is determined, and the respective weights are determined from the weight frequency response, e.g., by converting the effective channel response to the time domain to determine coefficients of a corresponding time-domain effective channel model. Delays with the greatest coefficients may be selected.

According to still further embodiments of the present invention, delays may be selected incrementally for inclusion in a group of delays. A first delay is selected for the group of delays, e.g., using the above-described techniques or some other selection technique. A signal and noise content estimate is estimated for a second delay from a weight associated with the first delay. The second delay is selected for the group of delays based on the generated signal and noise content estimate. A correlation between composite signal information for the first delay and composite signal information for the second delay may be determined, and the signal and noise content estimate for the second delay may be determined from the correlation and the weight associated with the first delay. According to further embodiments of the present invention, a signal and noise content estimate may be generated without inverting a noise covariance matrix.

In some embodiments of the present invention, respective signal and noise content estimates for respective ones of the plurality of second delays may be generated from the weight associated with the first delay. Selecting a second delay for the group of delays based on the generated signal and noise content estimate may include selecting from among the plurality of second delays based on the signal and noise content estimates. Such a process may occur iteratively, e.g., a first one of the second delays may be selected, followed by determining new respective weights for respective ones of the selected group of delays including the selected first one of the second delays, generating new signal and noise content estimates for respective ones of the plurality of second delays not yet selected, and selecting a second one of the second delays based on the new signal and noise content estimates. Selection of a new candidate delay may include substituting for a previously selected one of the selected group of delays based on a comparison of signal and noise content estimates.

In still further aspects of the present invention, delays, e.g., RAKE correlator delays and/or chip equalizer filter taps, may be evaluated in an aggregate manner, e.g., as "super fingers." An aggregate signal and noise content estimate is generated for a set of delays. The set of delays is evaluated for inclusion in the group of selected delays based on the aggregate signal and noise content estimate.

According to further embodiments of the present invention, channel and correlation characteristics are determined for a composite signal. Respective weights for information from the composite signal is determined for respective ones of a plurality of candidate delays based on the determined channel and correlation characteristics. A group of delays is selected from the plurality of candidate delays that have weights meeting a predetermined criterion. Information from the composite signal for the selected delays is processed according to a spreading code to generate a symbol estimate.

In yet additional embodiments of the present invention, a signal is recovered from a composite signal. Channel and correlation characteristics are determined for the composite signal. Respective combining weights for information from the composite signal are determined for respective ones of a plurality of candidate delays based on the determined channel and correlation characteristics. A first delay is selected for inclusion in a group of delays. A signal and noise content estimate is generated for a second delay from a weight associated with the first delay. The second delay is selected for inclusion in the group of delays based on the generated signal and noise content estimate. Information from the composite signal for the selected delays is processed according to a spreading code to generate a symbol estimate.

In further embodiments of the present invention, a spread spectrum communications receiver includes a radio processor configured to receive a radio signal including signals from a plurality of sources and to produce a composite baseband signal including signals from a plurality of sources. The receiver further includes a baseband processor configured to determine channel and correlation characteristics for the composite signal, to determine respective weights for information from the composite signal for respective ones of a plurality of candidate delays based on the determined channel and correlation characteristics, to select a group of delays from the plurality of candidate delays based on the determined weights, and to process information from the composite signal for the selected delays according to a spreading code to generate a symbol estimate.

According to additional embodiments of the present invention, a computer program product includes computer program code including code configured to determine channel and correlation characteristics for the composite signal, code configured to determine respective combining weights for information from the composite signal for respective ones of a plurality of candidate delays based on the determined channel and correlation characteristics, code configured to select a group of delays from the plurality of candidate delays based on the determined combining weights, and code configured to process information from the composite signal for the selected delays according to a spreading code to generate a symbol estimate.

DETAILED DESCRIPTION OF EXEMPLARY EMBODIMENTS

Figure 1:
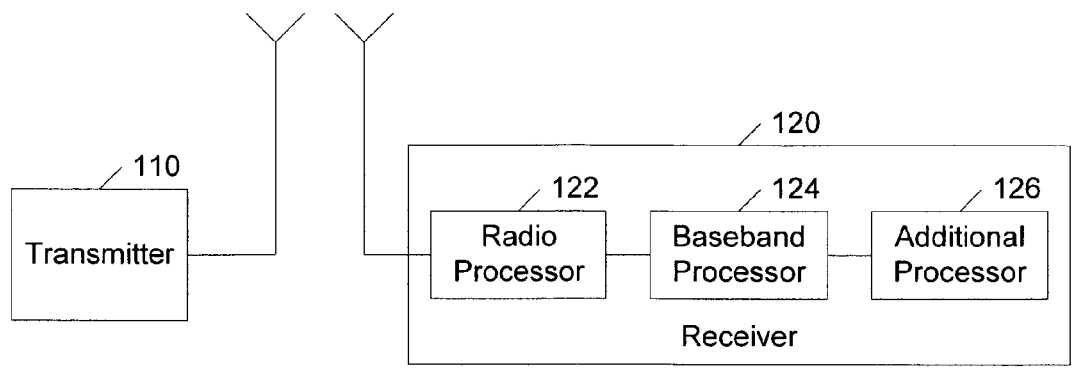
FIG. 1 is a block diagram illustrating a conventional spread spectrum communications system.
Figure 2:
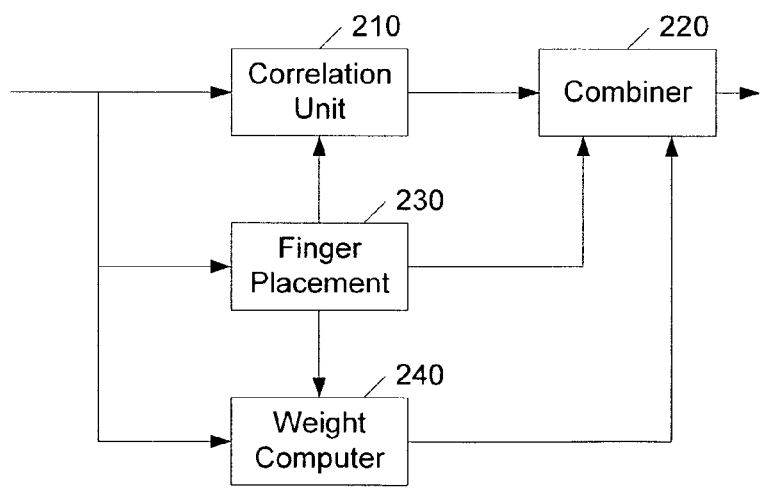
FIG. 2 is a block diagram illustrating a conventional baseband processor with a generalized RAKE structure.
Figure 3:
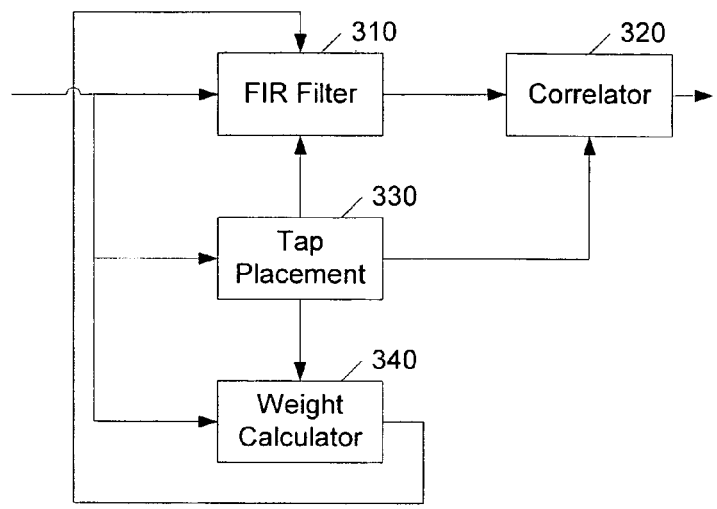
FIG. 3 is a block diagram illustrating a conventional baseband processor with a chip equalizer structure.
Figure 4:
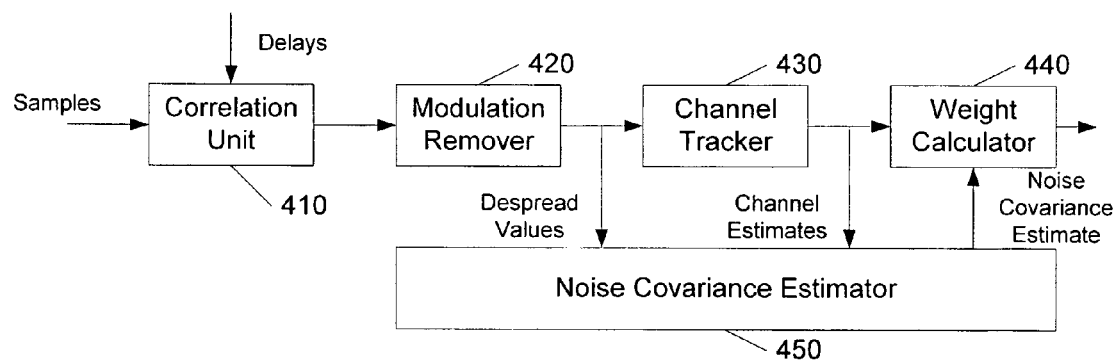
FIG. 4 is a block diagram illustrating a weight computer for a generalized RAKE receiver.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the terms "comprising", "comprises", "includes" and "including" are open-ended, i.e., refer to one or more stated elements, steps and/or functions without precluding one or more unstated elements, steps and/or functions. It will also be understood that the term "and/or" as used herein refers to and encompasses any and all possible combinations of one or more of the associated listed items. It will be further understood that when transfer, communication, or other interaction is described as occurring "between" elements, such transfer, communication or other interaction may be unidirectional and/or bidirectional.

The present invention is described below with reference to block diagrams and/or operational illustrations of methods, apparatus and computer program products according to embodiments of the invention. It will be understood that each block of the block diagrams and/or operational illustrations, and combinations of blocks in the block diagrams and/or operational illustrations, can be implemented by analog and/or digital hardware and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

According to some embodiments of the present invention, electronic apparatus may include a radio receiver configured to provide operations described herein. Such a receiver may be included in any of a number of types of devices, including, but not limited to: cellular handsets and other wireless terminals, cellular base stations or other types of radio network nodes, and wireline receiver devices. Computer program code for carrying out operations of the present invention may be written in an object oriented programming language, a procedural programming language, or lower-level code, such as assembly language and/or microcode. The program code may execute entirely on a single processor and/or across multiple processors, as a stand-alone software package or as part of another software package.

According to various embodiments of the invention, determination of delays, e.g., signal paths such as RAKE correlator fingers or equalizer filter taps, may be achieved by determining weights for candidate delays from channel and correlation characteristics for a composite signal. In some exemplary embodiments, a maximal weight criterion may be used to select correlator delays and/or equalizer filter taps. In other exemplary embodiments, a signal to noise ratio metric derived from the weights may be used to identify desirable delays or taps. In further embodiments, a channel frequency response may be used to compute weights, which may be selected by a maximal weight or other criterion.

Figure 5:
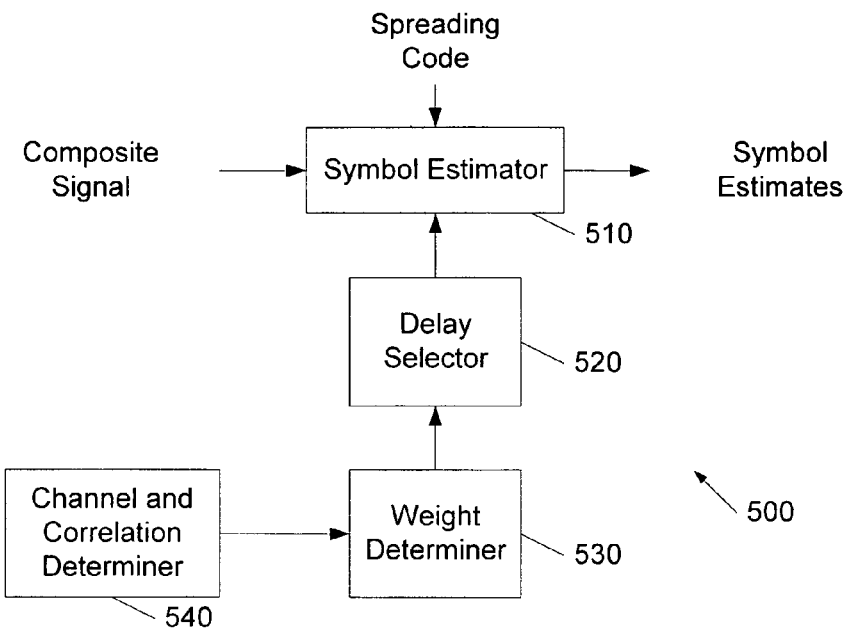
FIG. 5 is a block diagram illustrating a signal processing apparatus according to some embodiments of the present invention.

FIG. 5 illustrates a signal processing apparatus 500 according to some embodiments of the present invention. The apparatus 500 includes a symbol estimator 510, e.g., a combination of a correlation unit and combiner as used in a generalized RAKE receiver architecture or a combination of a FIR filter and a correlator as used in a chip equalizer. The symbol estimator 510 processes a composite signal according to a spreading code using delays, e.g., correlator delays or filter taps, selected from a plurality of candidate delays by a delay selector 520. The delay selector 520 selects the delays responsive to combining weights generated by a weight determiner 530. The combining weights 530 are generated responsive to channel and correlation characteristics determined by a channel and correlation determiner 540.

As described in detail below, apparatus and operations along the lines described with reference to the apparatus 500 may be implemented in a number of different ways according to various embodiments of the present invention. For example, according to various embodiments of the invention, selection of delays, e.g., correlator finger delays, equalizer filter taps and/or signal sources (e.g., different antennas), occurs based on a maximal weight criterion. In other exemplary embodiments, a signal to noise ratio metric derived from such weights may be used to identify desirable correlator delays (fingers) or taps. In further embodiments, a channel frequency response may be used to compute weights, which may be selected by a maximal weight or other criterion.

It will be appreciated that apparatus and methods according to various embodiments of the invention may generally be implemented using analog and/or digital electronic circuits. For example, the functional blocks 510-540 may be implemented using program code executing on a data processing device, such as a microprocessor or digital signal processor (DSP), or in data processing circuitry included in a special-purpose electronic device, such as a communications ASIC. The present invention may also be embodied as computer code configured such that, when executing on a data processing device, provides the above-described operations.

Figure 6:
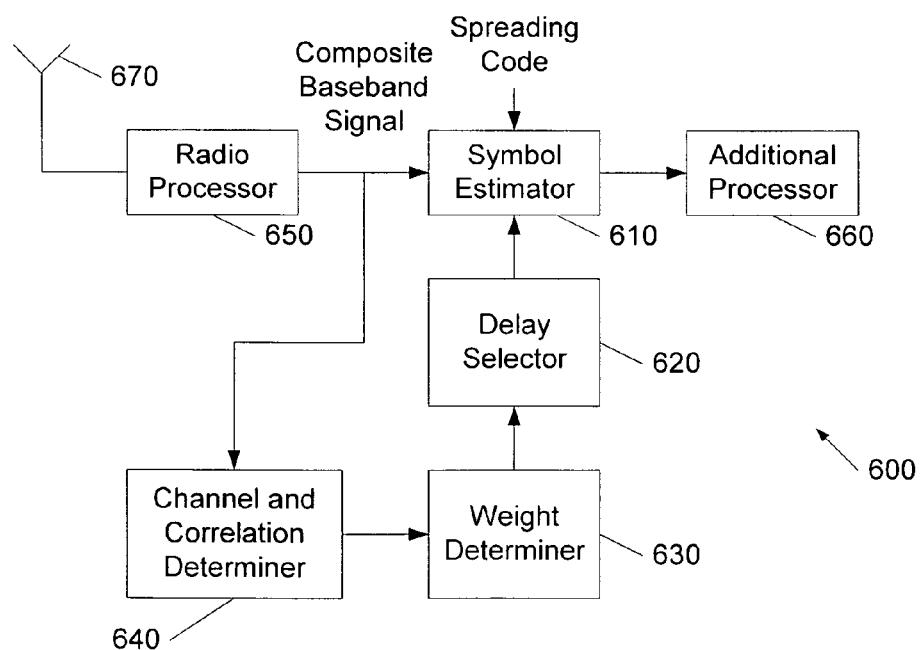
FIG. 6 is a block diagram illustrating a radio receiver according to further embodiments of the present invention.

FIG. 6 illustrates a receiver 600 including a signal processing apparatus along the lines shown in FIG. 5. Radio signals, which may include information from multiple transmitting sources, are received by an antenna 670 and provided to a radio processor 650, which performs filtering, downconversion and other processes that produce a composite baseband signal. The baseband signal is provided to a baseband processor including a symbol estimator 610, a delay selector 620, a channel and correlation determiner 640 and a weight determiner 630, which may function in the same manner as corresponding items described above with reference to FIG. 5. Symbol estimates produced by the symbol estimator 610 are provided to an additional processor 660, which may perform other signal processing functions, such as error correction decoding.

Figure 7:
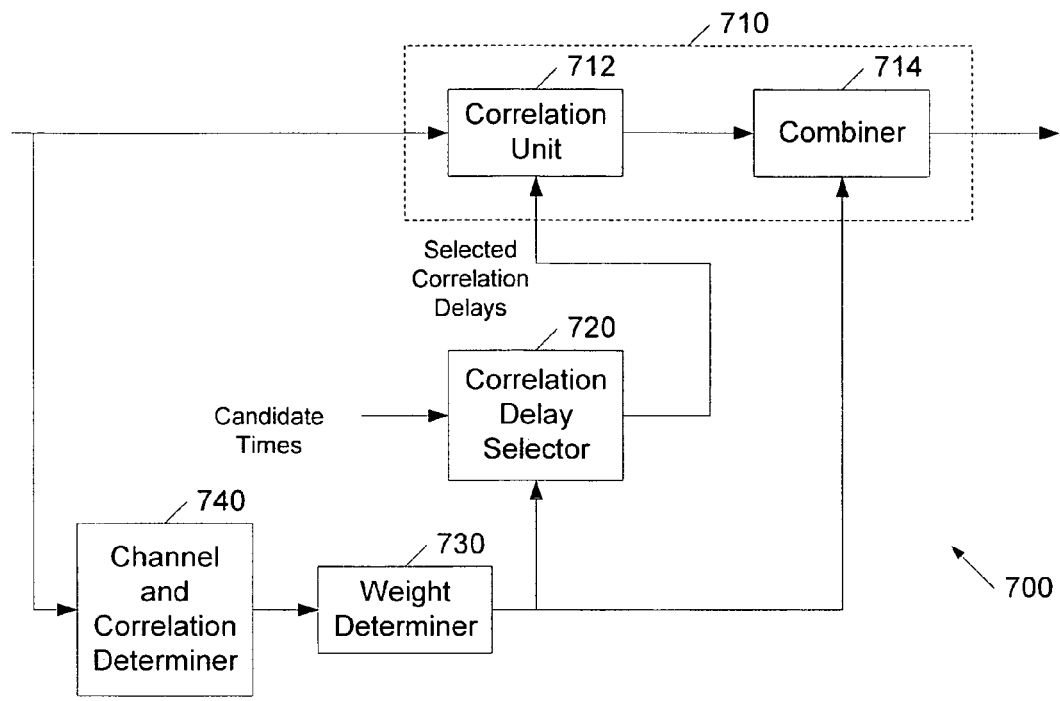
FIG. 7 is a block diagram illustrating a signal processing apparatus with a generalized RAKE structure according to further embodiments of the present invention.

FIG. 7 illustrates a signal processing apparatus 700 according to further embodiments of the present invention. The apparatus 700 includes a symbol estimator 710 that processes a composite signal to generate a symbol estimate. The symbol estimator 710 includes a correlation unit 712 and a combiner 714. The correlation unit 712 correlates the composite signal with a spreading code using correlation delays selected from candidate delays by a correlation delay selector 720 responsive to weights determined by a weight determiner 730. The weight determiner 730 determines the weights responsive to channel and correlation characteristics, e.g., a combination of a channel estimate and a quantity correlation estimate, such as a noise covariance estimate, determined by a channel and correlation determiner.

Figure 8:
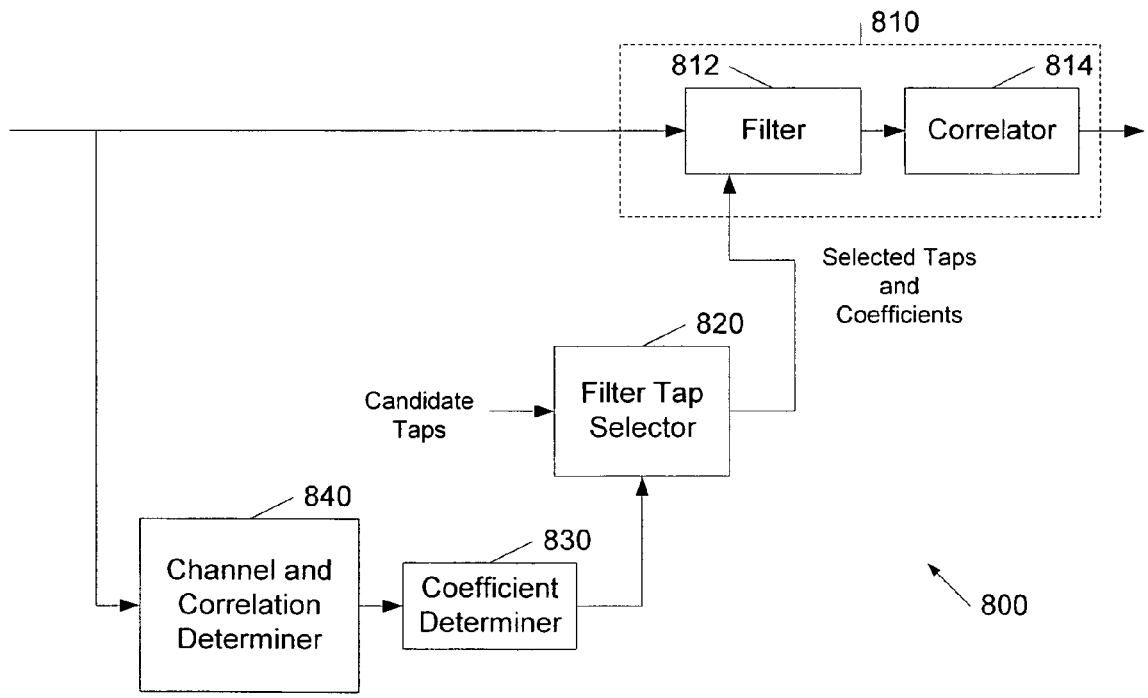
FIG. 8 is a block diagram illustrating a signal processing apparatus with a chip equalizer structure according to additional embodiments of the present invention.

FIG. 8 illustrates a signal processing apparatus 800 with an alterative chip equalizer structure according to further embodiments of the present invention. The apparatus 800 includes a symbol estimator 810 that processes a composite signal to generate a symbol estimate. The symbol estimator 810 includes a filter 812 that filters the composite signal and a correlator 814 that correlates the output of the filter 812 with a spreading code. Taps of the filter 812 are selected from a plurality of candidate taps by a filter tap selector 820 responsive to combining weights generated by a weight determiner 830. Coefficients of the filter 812 correspond to the coefficients (i.e., weights) for the selected taps. The coefficient determiner 830 determines the coefficients responsive to channel and correlation characteristics of the composite signal determined by a channel and correlation determiner 840.

Candidate delays, e.g., correlator delays and/or filter taps, provided to a signal processing apparatus such as those illustrated in FIGS. 5-8 may be generated in any of a number of different ways. For example, a "probing finger" approach may be used to generate candidate delays along the lines described in the aforementioned U.S. patent application Ser. No. 09/845,950, filed Apr. 30, 2001 (published as U.S. Patent Application Publication No. US 2001/0028677).

Figure 9:
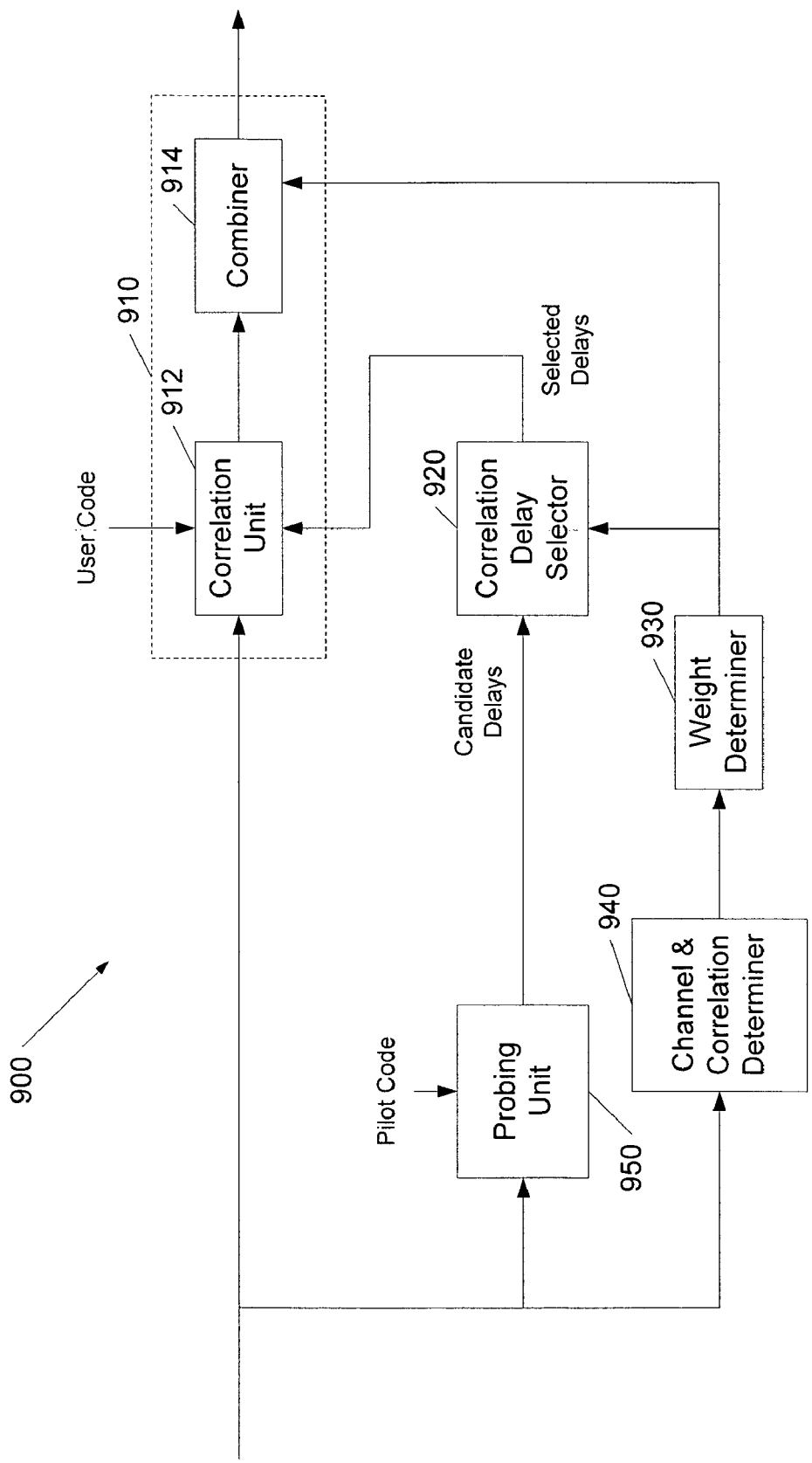
FIG. 9 is a block diagram illustrating a signal processing apparatus with a probing finger unit according to further embodiments of the present invention.

Such an implementation is illustrated in FIG. 9. As shown in FIG. 9, a signal processing apparatus 900 according to some embodiments of the present invention includes a symbol estimator 910 including a correlation unit 912 that correlates a composite signal with a traffic channel spreading code, and a combiner 914 that weightedly combines correlations produced by the correlator 912. The correlator 912 uses delays selected from a plurality of candidate delays by a correlation delay selector 920 responsive to weights generated by a weight determiner 930. The weights are generated based on channel and correlation characteristics generated by a channel and correlation determiner 940. Candidate delays provided to the correlation delay selector 920 are generated by a probing unit 950. The probing unit 950 may identify the candidate delays by, for example, correlating the composite signal to a pilot channel code, as described in the aforementioned U.S. patent application Ser. No. 09/845,950. It will be understood that other ways of identifying candidate delays or filter taps may also be used with the present invention.

Figure 10:
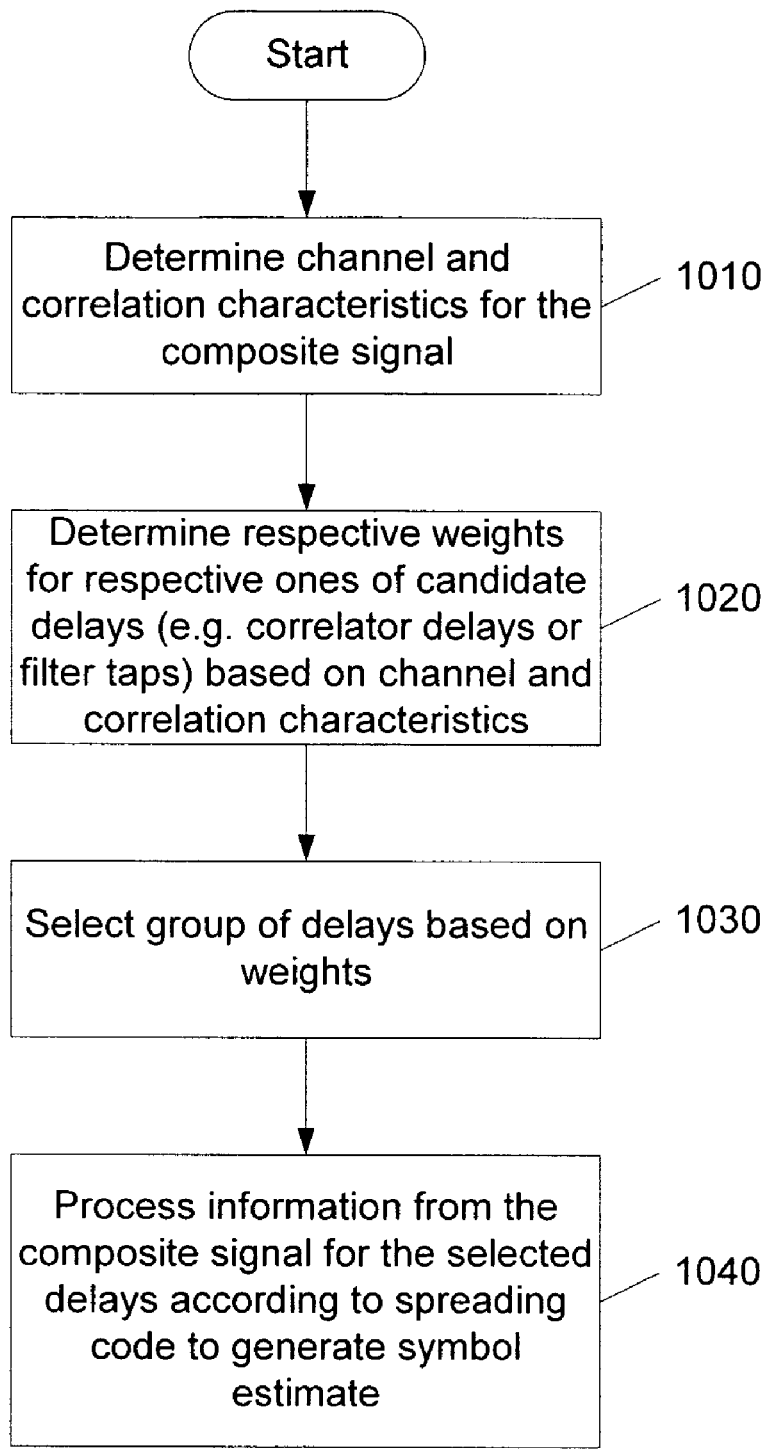
FIGS. 10-16 are flowcharts illustrating various correlator finger and filter tap selection operations according to various embodiments of the present invention.

FIG. 10 is a flowchart illustrating exemplary signal processing operations according to some embodiments of the present invention. Channel and correlation characteristics are determined for a composite signal that includes a desired signal along with interfering signals from one or more transmitting sources (block 1010). Respective weights are determined for respective ones of candidate delays based on channel and correlation characteristics for the composite signal (block 1020). A group of the candidate delays are selected based on the weights, e.g., by selecting those delays having the greatest associated weights or a desirable signal to noise estimate derived from the weights (block 1030). Here, "greatest associated weight" may be construed as largest magnitude, largest magnitude squared, etc. Information from the composite signal from the selected delays is processed according to a spreading code to generate a symbol estimate for a desired signal in the composite signal (block 1040).

According to some aspects of the present invention, a maximal weight criterion may be used to select delays, e.g., G-RAKE correlator delays or chip equalizer filter taps. Speaking in terms of a G-RAKE structure, assuming a set of N candidate correlator delays have been identified, and given a correlation characteristic in the form of a noise covariance matrix $R_N$ and a channel characteristic in the form of a vector of channel coefficients $c_N$ for the N candidate delays, combining weights $w_N$ for the candidate delays may be given by:

$$w_N = R_N^{-1} c_N. \quad (2)$$

The combining weights $w_N$ may be determined using, for example, direct matrix inversion or another method for solving a linear system of equations (e.g., the Gauss-Seidel method). A subset of the N candidate delays may be selected, according to some embodiments of the invention, by selecting those delays having the greatest associated weights.

Figure 11:
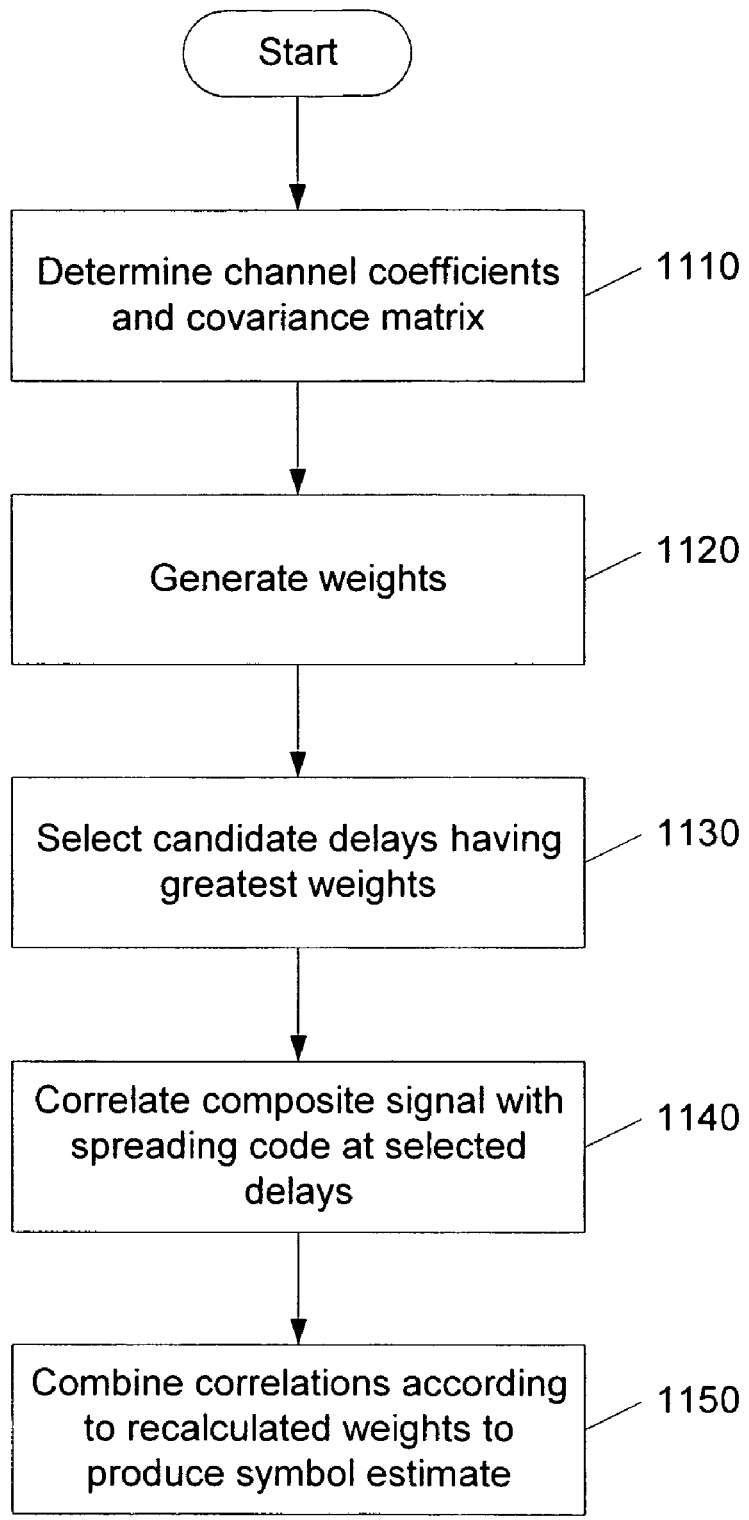

FIG. 11 shows exemplary signal processing operations according to such an approach. Channel coefficients and a covariance matrix for a composite signal and a set of candidate delays are determined (block 1110). Weights for the candidate delays are generated from the channel coefficients and the covariance matrix (block 1120). Candidate delays having the greatest weights are selected (block 1130). The composite signal is correlated with a spreading code at the selected delays (block 1140). The correlations produced are combined according to the recalculated weights to generate a symbol estimate (block 1150). Recalculation may be performed using (2) where N is replaced by the number of delays selected.

Figure 12:
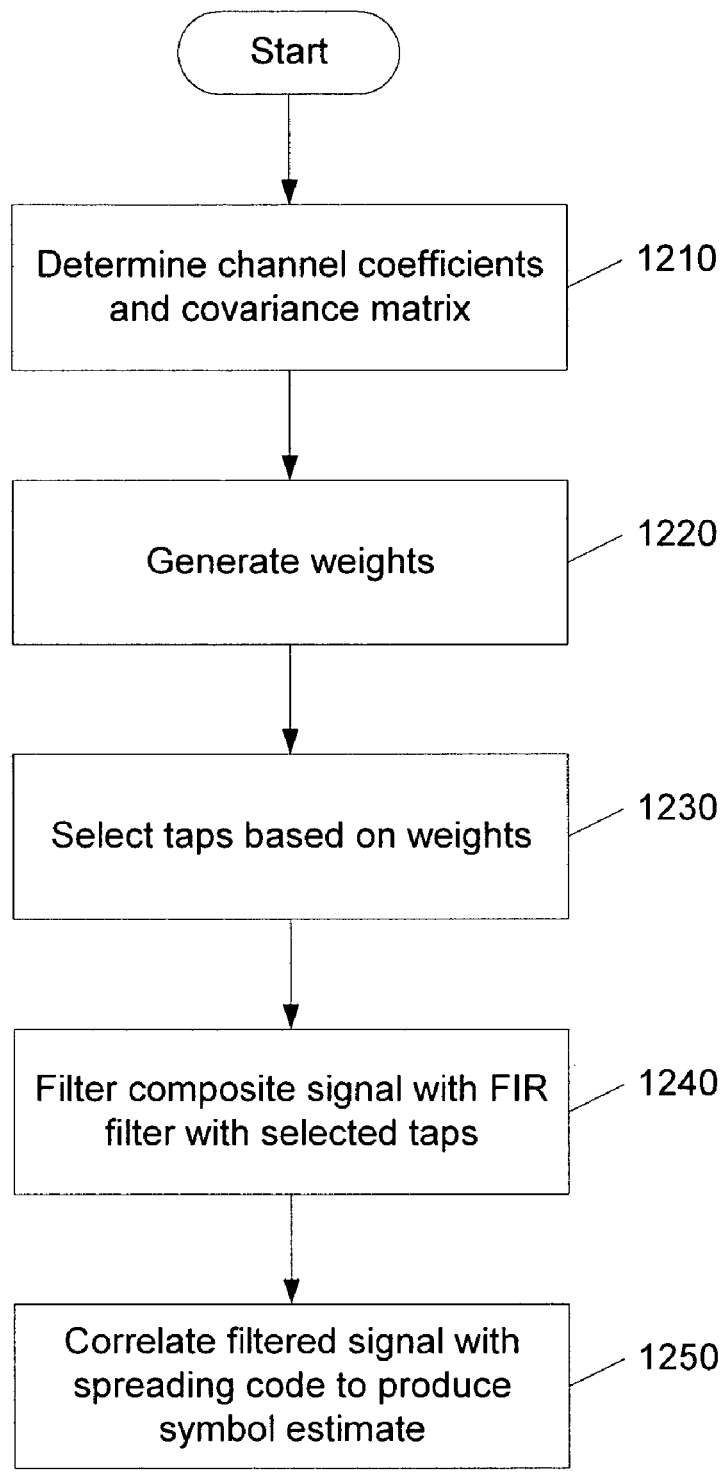

FIG. 12 shows exemplary operations in an alternative chip equalizer implementation. Channel coefficients and a covariance matrix for a composite signal and a set of candidate filter taps are determined (block 1210). Weights for the candidate filter taps are generated from the channel coefficients and the covariance matrix (block 1220). Candidate filter taps having the greatest weights are selected (block 1230). The composite signal is filtered using a finite impulse response (FIR) filter with nonzero coefficients only for the selected taps (block 1240). This can be implemented, for example, using a filter with programmable delays. The filter coefficients are obtained by recalculating the weights. The output of the FIR filter is correlated with a spreading sequence to generate a symbol estimate (block 1250).

It will be understood that delay selection may be done in a number of different ways within the scope of the present invention. For example, the weights may be sorted in ascending or descending order of magnitude and the first (or last) M delays selected. Alternatively, an iterative search technique may be used. For example, one could search for the largest magnitude weight, select the associated delay, and eliminate that delay (and weight) from consideration. It will be further understood that "quantity correlations" other than noise covariance may be used. For example, for minimum mean square error (MMSE) combining, a data correlation matrix generated corresponding to pilot despread values could be used.

According to further aspects of the present invention, RAKE correlator delays, chip equalizer filter taps or other delays may be selected in an incremental fashion by determining a signal and noise content change associated with adding particular delays or sets of delays. For purposes of the following discussion, a G-RAKE structure is assumed, and a group of M candidate fingers have already been selected. For such a set of M fingers, an M×1 vector c contains the corresponding channel taps and an M×M matrix R contains the corresponding correlation coefficients. The matrix R is Hermitian, and it is invertible, except in degenerate cases. An M×1 vector w contains the combining weights for the respective M fingers. The combiner output z is a weighted sum of the despread values, represented by a M×1 vector r:

$$z = w^H r. \quad (3)$$

For a given combining weight vector w, signal to noise ratio (SNR) may be expressed as:

$$\gamma = \frac{w^H c c^H w}{w^H R w}. \quad (4)$$

For a G-RAKE implementation, combining weights that theoretically maximize SNR may be given by:

$$w = R^{-1} c. \quad (5)$$

Accordingly, the SNR may be given by:

$$\gamma = c^H R^{-1} c. \quad (6)$$

If it is desired to add a new finger to the selected group, the effect of adding the new finger on the SNR can be determined from the weights and noise covariance for the previously selected fingers. Placing the new finger last in an updated channel tap vector c':

$$c' = \begin{bmatrix} c \\ \chi \end{bmatrix}, \quad (7)$$

wherein χ represents a new channel tap corresponding to the new finger. The new correlation matrix R' may be written as:

$$R' = \begin{bmatrix} R & \rho \\ \rho & \sigma^2 \end{bmatrix}, \quad (8)$$

wherein the M×1 vector ρ contains the correlation coefficients between the old fingers and the new finger and $\sigma^2$ is the noise variance of the new finger. The inverse $R'^{-1}$ of the new correlation matrix R' may be written as:

$$R'^{-1} = \begin{bmatrix} R^{-1} + \alpha R^{-1} \rho \rho^H R^{-1} & -\alpha R^{-1} \rho \\ -\alpha \rho^H R^{-1} & \alpha \end{bmatrix}, \quad (9)$$

where $$\alpha^{-1} = \sigma^2 - \rho^H R^{-1} \rho \quad (10).$$

Using equation (9), a new optimal weight vector may be given by:

$$w' = R'^{-1} c' = \begin{bmatrix} w + \Delta w \\ w \end{bmatrix}, \quad (11)$$

where a weight increment vector Δw is given by:

$$\Delta w = \alpha R^{-1} \rho \rho^H w - \alpha R^{-1} \rho \chi, \quad (12)$$

and represents a change to the old optimal weights due to the addition of the new finger. The weight w of the new finger may be given by:

$$w = -\alpha \rho^H w + \alpha \chi. \quad (13)$$

Assuming a "noise" finger, i.e., a finger that does not correspond to an echo of the desired signal, is being evaluated for addition, the channel tap χ can be set to zero, such that:

$$c' = \begin{bmatrix} c \\ 0 \end{bmatrix}. \quad (14)$$

For such a case, equation (12) can be simplified to:

$$\Delta w = \alpha R^{-1} \rho \rho^H w, \quad (15)$$

and equation (13) can be simplified to:

$$w = -\alpha \rho^H w. \quad (16)$$

A new SNR γ' can be expressed in terms of the old SNR γ, using equations (9) and (10):

$$\gamma' = c'^H R'^{-1} c' = \gamma + \Delta \gamma, \quad (17)$$

where the SNR increment Δγ may be given by:

$$\Delta \gamma = \alpha w^H \rho \rho^H w = \frac{w^H \rho \rho w}{\sigma^2 - \rho^H R^{-1} w}. \quad (18)$$

The SNR increment $\Delta\gamma$ represents the change in SNR attributable to the addition of the new finger.

Analysis of equation (18) reveals that the numerator may be maximized by matching the new correlation vector $\rho$ to the old weight vector $w$, and that the denominator may be minimized when the new correlation vector $\rho$ is matched to the old correlation inverse $R^{-1}$. Thus, to maximize the SNR increment $\Delta\gamma$, the new correlation vector $\rho$ may be along the eigenvector of the largest eigenvalue of the old correlation inverse $R^{-1}$. Because the old correlation R is invertible, it does not have a null space, so, for this optimal condition, the new correlation vector $\rho$ approaches being in the null space of the old correlation R. This can be interpreted to mean that the new finger should provide information about a dimension not covered well by the existing fingers.

According to some embodiments of the present invention, a simplified technique can be provided for determining an SNR increment that does not involve matrix inversion. A first order approximation $\tilde{w}'$ for the new weights can be given by:

$$\tilde{w}' = \begin{bmatrix} w \\ \tilde{w} \end{bmatrix}. \quad (19)$$

Instead of setting the weight $\tilde{w}$ for the new finger using equation (13), a value for the weight $\tilde{w}$ that maximizes the SNR $\tilde{\gamma}'$ for $\tilde{w}'$ can be determined. Using equations (4), (8) and (14):

$$\tilde{\gamma}' = \frac{\tilde{w}'^H c' c'^H \tilde{w}'}{\tilde{w}'^H R' \tilde{w}'} = \frac{w^H c c^H w}{w^H R w + \tilde{w}^* \rho^H w + w^H \rho \tilde{w} + \tilde{w}^* \sigma^2 \tilde{w}}. \quad (20)$$

The numerator of equation (20) does not depend on the weight $\tilde{w}$. The denominator may be minimized by:

$$\tilde{w} = -\frac{\rho^H w}{\sigma^2}, \quad (21)$$

which results in a maximum value for an approximate SNR $\tilde{\gamma}\tilde{w}'$ given by:

$$\tilde{\gamma}' = \frac{w^H c c^H w}{w^H R w - |\rho^H w|^2 / \sigma^2}. \quad (22)$$

An approximate SNR increment $\Delta\tilde{\gamma}'$ may be given by:

$$\Delta\tilde{\gamma}' = \tilde{\gamma}' - \gamma = \gamma \left( \frac{|\rho^H w|^2 / \sigma^2}{w^H R w - |\rho^H w|^2 / \sigma^2} \right). \quad (23)$$

This expression may be easier to compute than equation (18), as it does not require matrix inversion. Theoretically, the approximate SNR $\tilde{\gamma}'$ should be less than the SNR $\gamma'$ computed according to equation (17). If the number of old fingers is not too small, then the approximate SNR $\tilde{\gamma}'$ can closely approximate the SNR $\gamma'$ computed according to equation (17). Accordingly, the approximate SNR $\tilde{\gamma}'$ (or increment $\Delta\tilde{\gamma}'$) can be used to evaluate the new finger.

Figure 13:
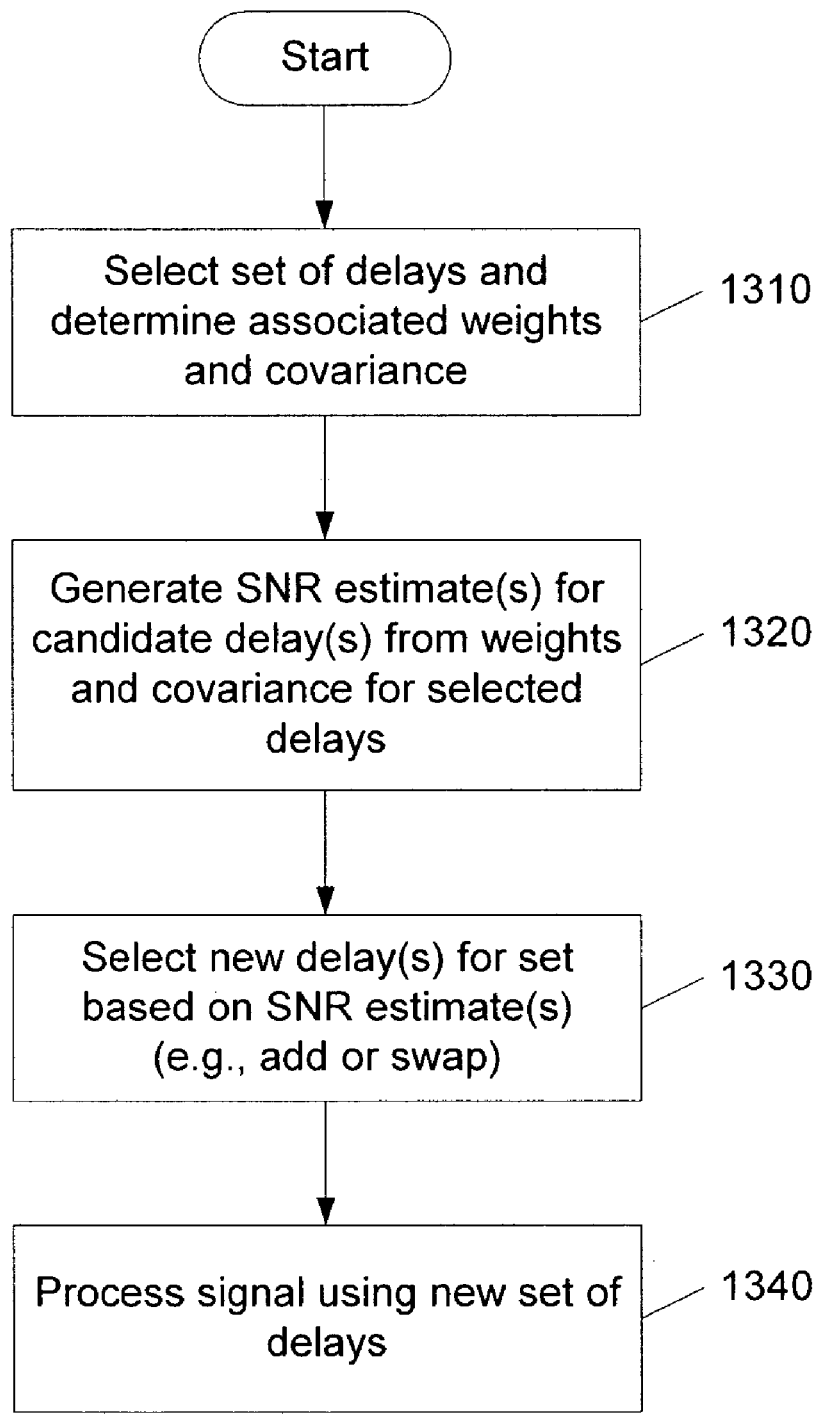

FIG. 13 illustrates exemplary operations for incrementally selecting G-RAKE fingers according to some embodiments of the present invention. It is assumed that one or more members of a set of delays have been selected, and that the associated weights and covariance matrix have been determined (block 1310). SNR estimates are generated for one or more candidate delays from the predetermined weights and covariance matrix for the previously selected delays (block 1320). One or more new delays are selected based on the SNR estimates (block 1330), and the new delay(s) are used to process the composite signal (block 1340). The selection may be additive and/or may involve the replacement of a previously selected delay, e.g., if the "old" delay was added by the incremental process, its SNR estimate could be retained in memory and compared to newly determined SNR estimates for new candidate fingers to determine whether to replace the old delay with the new delay.

Figure 14:
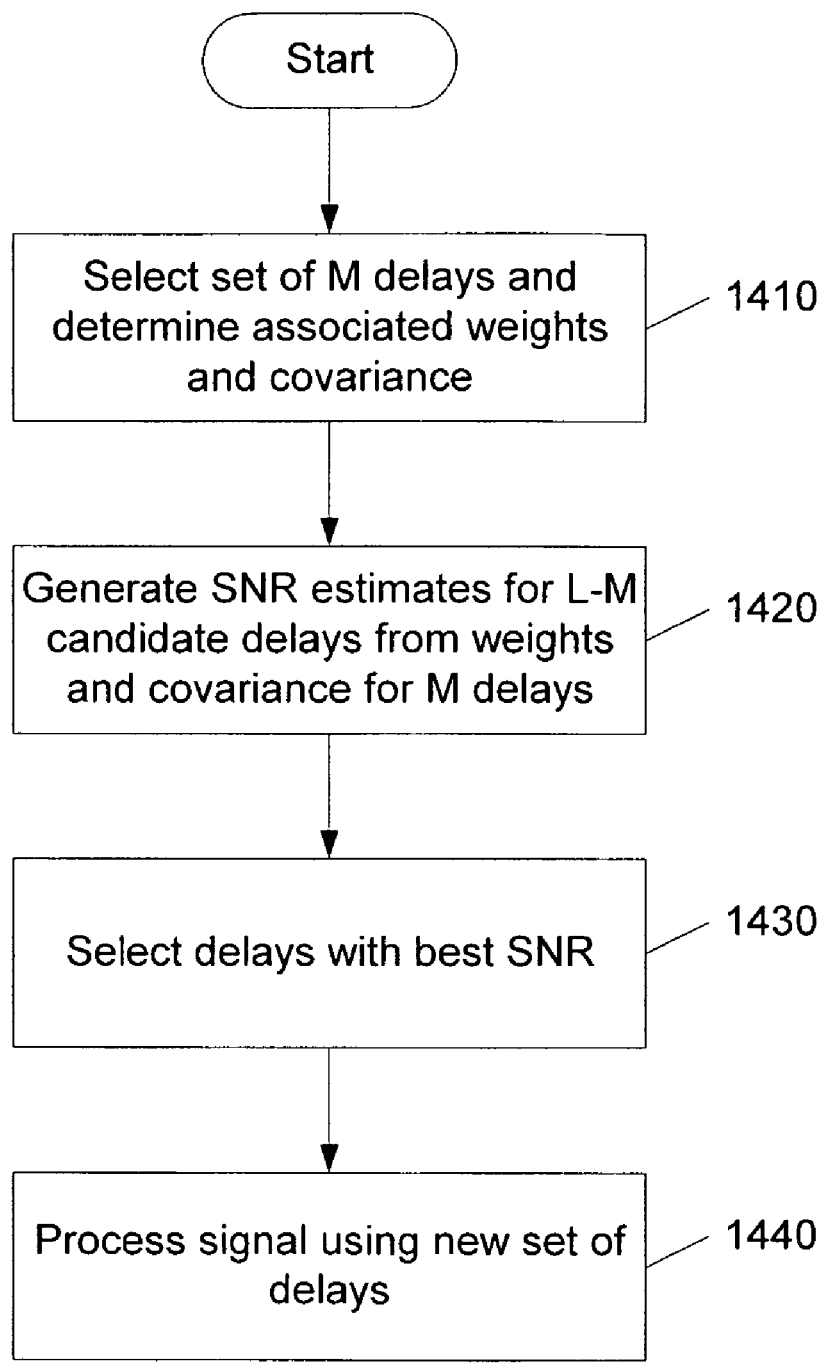

FIG. 14 illustrates exemplary operations for incrementally selecting delays according to further embodiments of the present invention. Again, it is assumed that a set of M delays has already been selected from a plurality of L candidate delays, and that the associated weights and covariance matrix have been determined (block 1410). SNR estimates for the L–M remaining candidate delays are generated from the weights and covariance matrix from the M delays (block 1420). These SNR estimates correspond to the set of M already selected delays plus one additional delay. The set of selected delays is updated by selecting the remaining candidate delays having the greatest SNR estimate (block 1430), and using the updated set of delays in processing the composite signal (block 1440).

Figure 15:
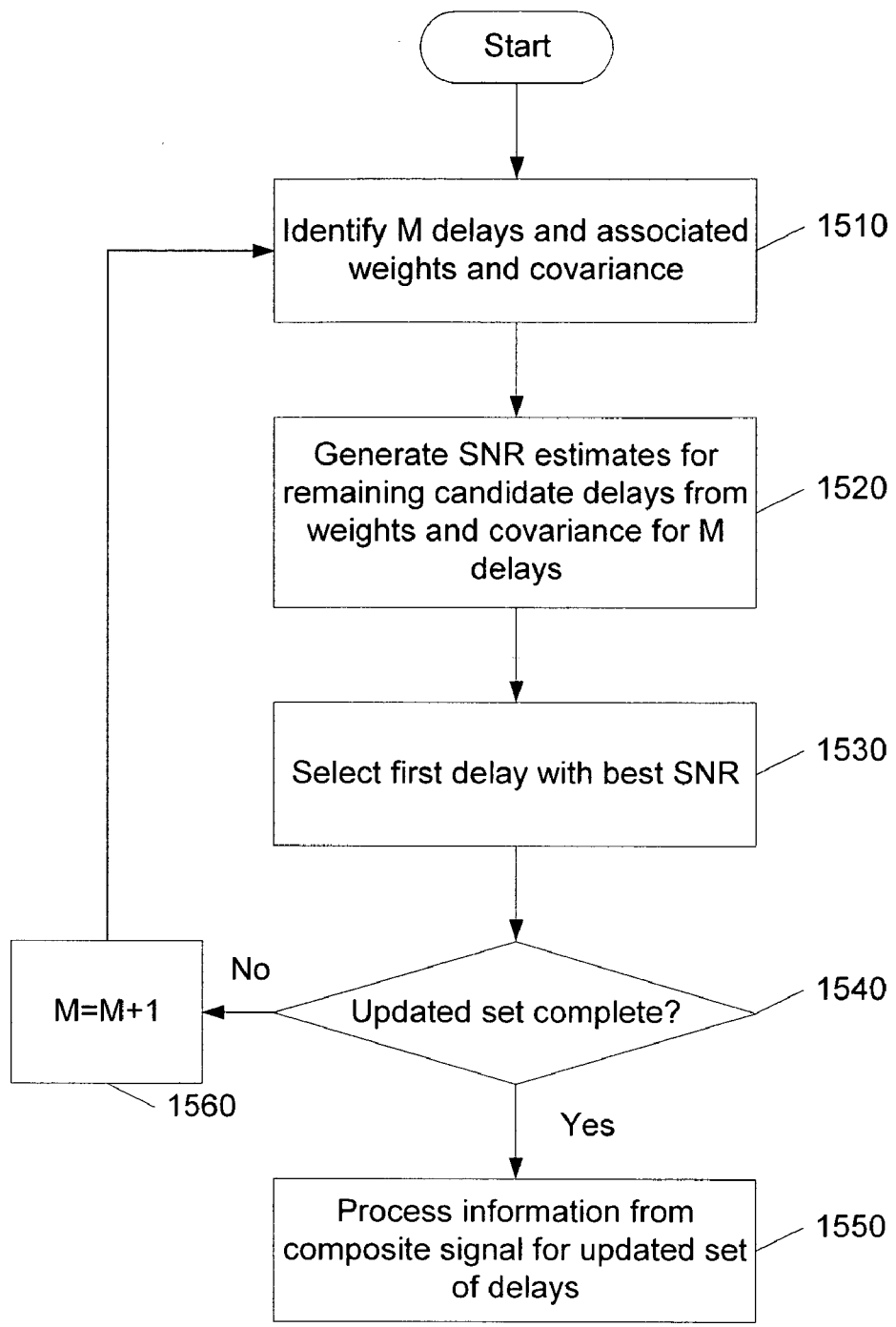

An alternative incremental approach according to further embodiments of the present invention is illustrated in FIG. 15. A set of M delays is selected from a plurality of L candidate delays, and the associated weights and covariance matrix are determined (block 1510). SNR estimates for the remaining candidate delays are generated from the weights and covariance matrix for the previously selected delays (block 1520). A delay with the best SNR estimate is selected (block 1530). If the desired number of new delays has been selected (block 1540), the updated group of selected delays is used to process the composite signal (block 1550). If not, however, new weights and a new covariance metric are computed for the selected group of delays including the newly selected delay (blocks 1560, 1510), new SNR estimates for the remaining candidate delays are generated (block 1520), and another new delay is selected (block 1530). The approach illustrated in FIG. 15 may be more computationally intensive than the operations of FIG. 14, but it can exploit more information and, thus, can provide more accurate results, e.g., can do a better job of avoiding redundant choices.

According to additional embodiments of the present invention, an incremental approach to selecting delays or taps may be implemented by treating groups of delays in an aggregate fashion, i.e., as "super fingers." Due to complexity considerations, a receiver may not be able to evaluate every finger individually. To reduce complexity, the receiver could identify groups of fingers to be evaluated as a group. If the group as a whole indicates a desirable level of SNR improvement, the group as a whole may be added to the selected set of fingers without individually evaluating each finger of the group.

Figure 16:
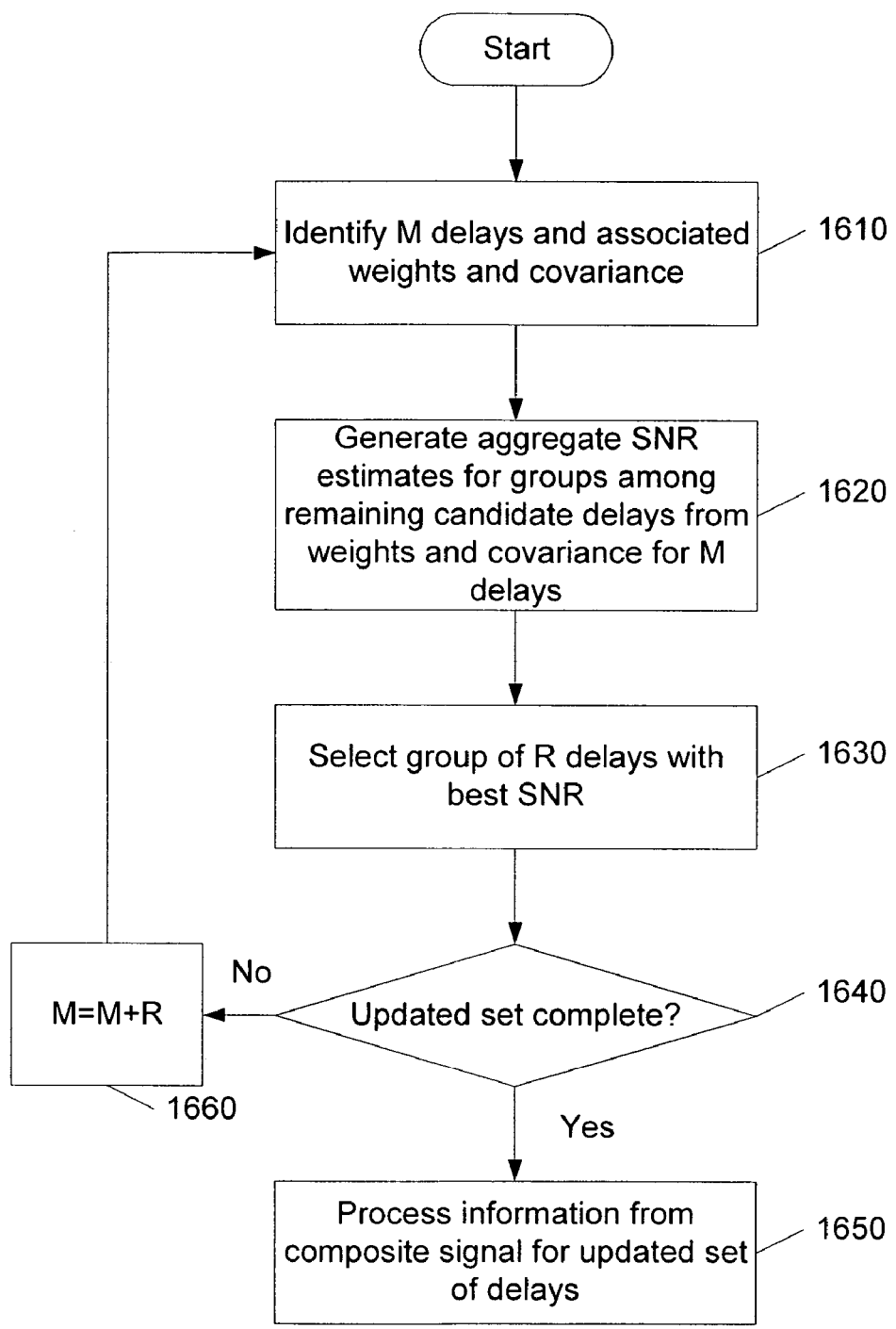

Exemplary operations for such an approach are illustrated in FIG. 16. A set of M delays is selected from a plurality of L candidate delays, and the associated weights and covariance matrix are determined (block 1610). An aggregate SNR estimate for a group (or groups) of the remaining candidate delays are generated from the weights and covariance matrix for the previously selected delays (block 1620). The group of R delays with the best SNR estimate is selected (block 1630). If the update of the selected delays is complete (block 1640), the updated set, including the selected group of R delays, is used to process the composite signal (block 1650). If not, updated weights and a new covariance matrix are determined (blocks 1660, 1610), new SNR estimates are generated (block 1620), and a new set of delays are selected (block 1630). Once criterion for completeness is that the total number of available fingers has been used. It will be appreciated that the group-based approach illustrated in FIG. 16 may be combined with the individual evaluation approach of FIG. 15, e.g., super fingers may be evaluated along with individual fingers.

It may be noted that in determining channel tap and correlation parameters for a super finger, the aggregation process can destroy useful information associated with the individual fingers in the super finger. In other words, it is possible for component fingers to exhibit useful correlation to fingers already selected, but the correlation may cancel in the super finger aggregation. For the super finger, exact (e.g., equation (18)) or approximate (e.g., equation (23)) SNR estimates may be used. If the SNR estimate is large, it indicates that the group or subgroups is of interest. If the receiver has spare computations, it may decide to investigate individual fingers in the group in detail. Alternatively, it may identify the group for more scrutiny in a future evaluation. If the SNR improvement is small, the receiver may discard the group. If a super finger provides a significant SNR improvement, it can be used directly in the G-RAKE combiner, i.e., it is not necessary to treat the component fingers individually in the combiner, as the same weighting may be applied to each.

A super finger may be viewed as an average of a number of fingers. It may be further viewed as a low-pass combination, which can result in information loss that increases as the number of fingers increases. This aspect can be extended by using a Hadamard-like structure. For example, supposing that a group includes $2^j$ fingers, a +1/−1 weight vector can be applied to the fingers and the result summed. The Hadamard sequences provide all ($2^{j-1}$) balanced sequences (same number of +1 and −1). These can be used to attempt to obtain a super finger with a significant SNR improvement. This may be viewed as a form of simplified pre-combining using only +1's and −1's.

Yet other aspects of the present invention can be described in terms of a chip equalizer structure, although these approaches are also applicable to the selection of G-RAKE correlator delays. Selecting combining fingers in a G-RAKE receiver may be viewed as analogous to setting all of the coefficients of a chip equalizer FIR filter to 0 except for a small subset. Formulation of the chip equalizer can be performed in the frequency domain.

Figure 17:
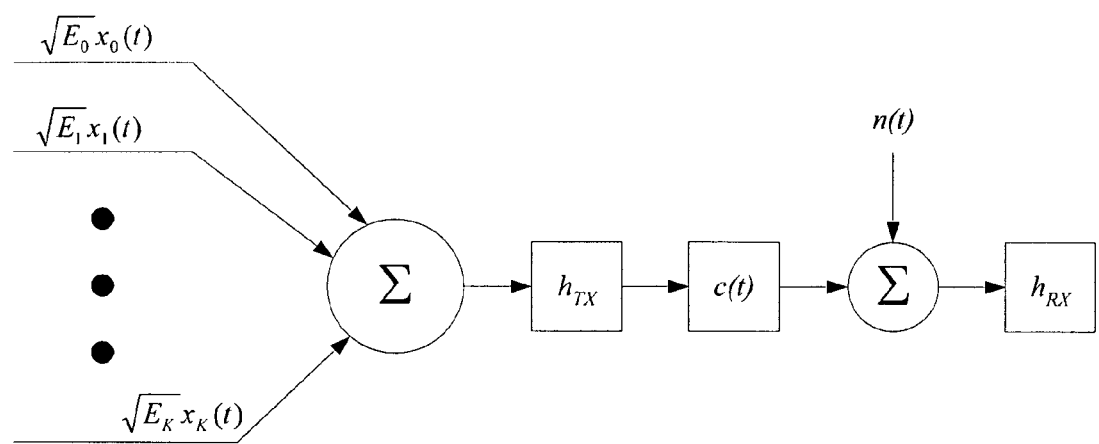
FIG. 17 is a block diagram illustrating a system model for a spread-spectrum communications system.

FIG. 17 illustrates a representative downlink structure for a spread-spectrum signal (e.g., IS-2000 and CDMA) for a terminal connected to a single base station. The nomenclature used in FIG. 17 is as follows: $x_i(t)$ represents the $i^{th}$ user's spread/scrambled signal; $E_i$ represents the energy per symbol of the $i^{th}$ user's signal; $h_{TX}$ is the impulse response of the transmit filter; $c(t)$ is the time-varying channel response; $h_{RX}$ is the impulse response of receive filter; and $n(t)$ is complex additive white Gaussian noise with variance $N_o$.

A colored noise matched filter for the system in FIG. 17 is given by:

$$H_E(\omega) = \frac{H_{TX}^*(\omega)H_c^*(\omega)X_0^*(\omega)e^{j\omega t_0}}{E_I|H_{TX}(\omega)H_c(\omega)|^2 + N_0}, \quad (24)$$

where $H_{TX}(\omega)$ is the Fourier transform of $h_{TX}$, $H_c(\omega)$ is the Fourier transform of $c(t)$, $X_0(\omega)$ is the Fourier transform of $x_0(t)$, and $$E_I = \sum_{k=1}^{K} E_k. \quad (25)$$

In the context of the presumed system model and the assumed structure of the chip equalizer, terms of equation (24) can be associated with the receive filter, the FIR filter or weighting filter, and the correlator. These terms can be obtained by inspection:

receive filter- $H_{TX}^*(\omega)$;

$$\text{FIR filter-} H_{wt}(\omega) = \frac{H_c^*(\omega)e^{-j\omega t_0}}{E_I|H_{TX}(\omega)H_c(\omega)|^2 + N_0}; \text{ and} \quad (26)$$

correlator- $X_0^*(\omega)$.

An issue is how to compute a weight frequency response at the weighting filter. This weighting filter may be given by (26).

For the given system, the product $H_{TX}(\omega)H_c(\omega)H_{RX}(\omega)$ is the Fourier transform $H_{NET}(\omega)$ of the net channel coefficients. $H_{RX}(\omega)$ is typically known exactly or approximately at the receiver. Therefore, $H^*_{TX}(\omega))H^*_c(\omega)$ can be computed as follows:

$$H_{TX}^*(\omega) H_c^*(\omega) = \left(\frac{H_{NET}(\omega)}{H_{RX}(\omega)}\right)^*, \quad (27)$$

and only the signal energy $E_1$ and the noise variance $N_0$ are needed to compute the frequency response $H_{eff}(\omega)$. To obtain estimates of the signal energy $E_1$ and the noise variance $N_0$, a procedure as described, for example, in application Ser. No. 10/943,274, entitled "Method and Apparatus for CDMA Receivers" filed by Coats and Bennett, may be used.

Figure 18:
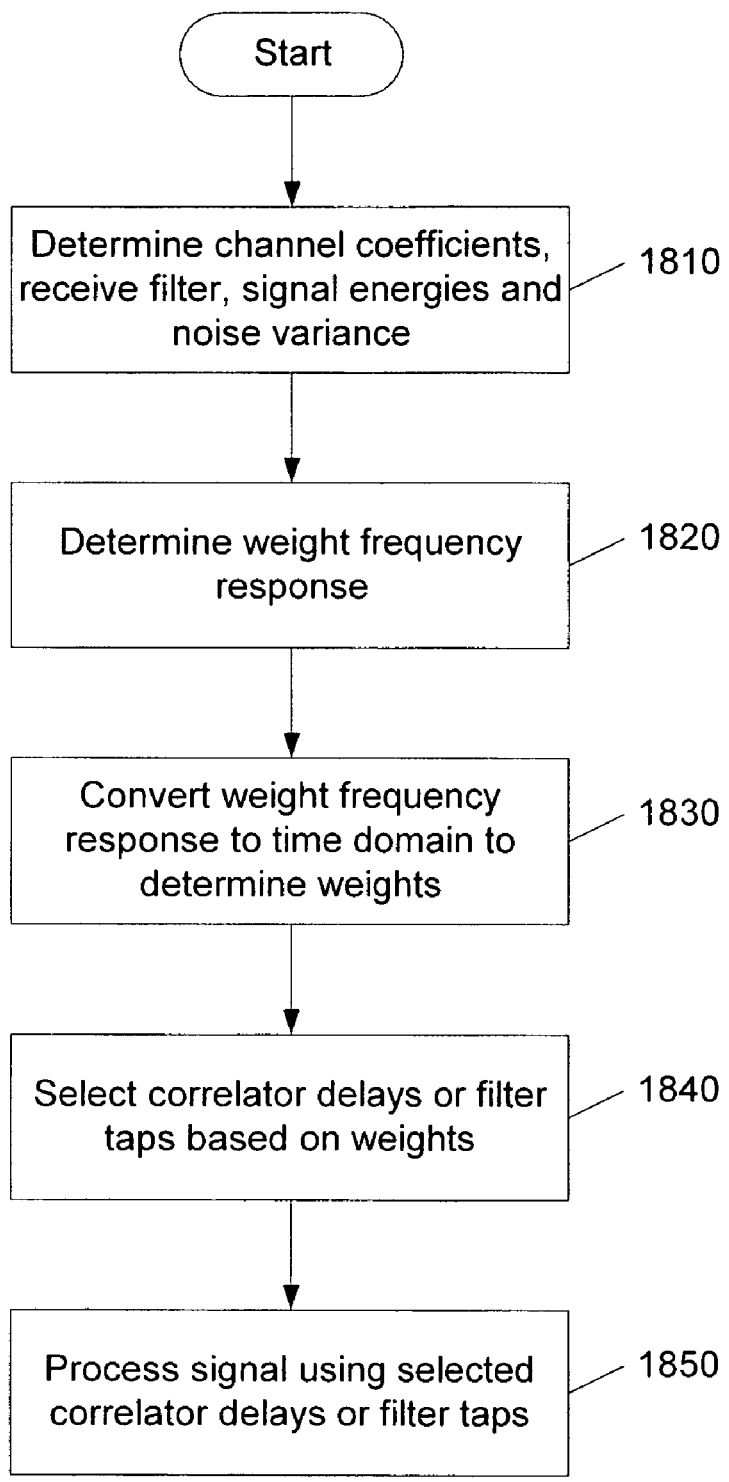
FIG. 18 is a flowchart illustrating correlator finger and filter tap selection operations according to further embodiments of the present invention.

FIG. 18 illustrates exemplary embodiments for selecting correlator delays or filter taps using a weight frequency response according to some embodiments of the present invention. Channel coefficients, a receive filter response, signal energies and a noise variance are determined (block 1810). A weight frequency response (e.g., equation (26)) is determined from these factors (block 1820). This weight frequency response is converted to the time domain to produce a time-domain weight frequency response (1830). Correlator delays or FIR filter taps are selected based on the weights (block 1840). A composite signal is processed using the selected delays or taps (block 1850).

The block and flow diagrams of FIGS. 5-16 and 18 illustrate architecture, functionality, and operations of possible implementations of apparatus, methods and computer program products according to various embodiments of the present invention. It should also be noted that, in some alternative implementations, the acts noted in the diagrams may occur out of the order noted in the figures. For example, two operations shown in succession may, in fact, be executed substantially concurrently, or the operations may sometimes be executed in the reverse order, depending upon the functionality involved.

Further variations on the above-described apparatus, methods and computer program products also fall within the scope of the present invention. For example, techniques that use "quantity correlations," e.g., noise covariance or data correlations, can obtain such correlations using parametric or non-parametric approaches. A non-parametric approach may involve, for example, using a set of probing fingers or existing fingers to measure the quantity correlations. A parametric approach may involve, for example, computation of a noise correlation using channel estimates and/or other quantities.

Figure 19:
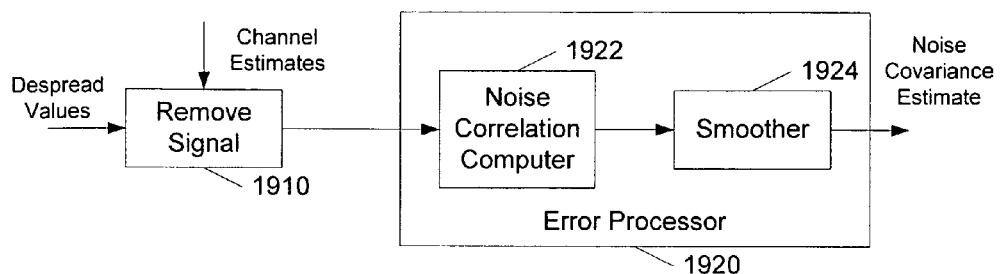
FIG. 19 is a block diagram illustrating a nonparametric noise covariance estimator.

A conventional non-parametric noise covariance estimator that may be used with the present invention is described in FIG. 19 of U.S. Patent Publication No. 2005/0078742 to Bottomley et al. Channel estimates are provided to a remove signal unit 1910, which subtracts the channel estimates from (modulation removed) despread values to form error values. An error processor 1920 receives the error values and includes a noise correlation computer 1922 wherein errors are multiplied by the conjugates of other errors to produce noise correlation values. These noise correlation values are then provided to a smoother 1924 that averages the values overtime, e.g., multiple slots.

Figure 20:
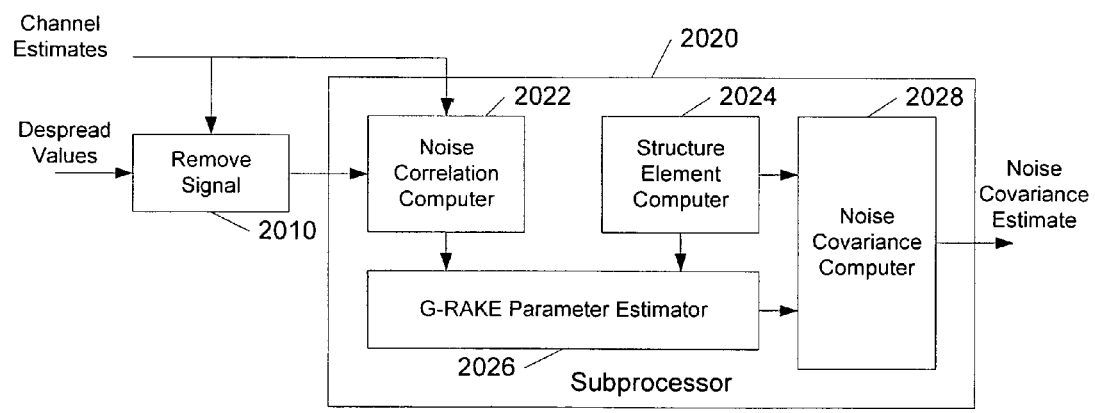
FIG. 20 is a block diagram illustrating a parametric noise covariance estimator.

A parametric noise covariance estimator that may be used with the present invention is described in U.S. application Ser. No. 10/800,167, filed Mar. 12, 2004, entitled "Method and Apparatus for Parameter Estimation in a Generalized Rake Receiver," is shown in FIG. 20. A remove signal unit 2010 produces an error signal that is used to perform a noise correlation measurement in a noise correlation computer 2022 of a subprocessor 2020. Measurements are fitted to a model of noise covariance that includes structure elements provided by a structure element computer 2024 and scaling parameters determined by a G-RAKE parameter estimator 2026. The scaling parameters and structure elements are combined by a noise covariance computer 2028 to produce a noise covariance estimate.

For non-parametric approaches, fingers may be placed at candidate delays to measure data or noise correlations. For a chip equalizer, samples could be correlated with other samples based on the candidate delays. For parametric approaches, a concept of "virtual" probing fingers may be introduced, i.e., a parametric approach can allow evaluation of candidate delays or taps even if information from actual corresponding physical delays or taps is not available.

It will be further appreciated that the present invention also encompasses embodiments in which multiple receive antennas are used. For example, finger or tap selection could be done on an antenna-by-antenna basis, or combined quantity correlations could be used to select delays from multiple antennas. The present invention also covers embodiments in which transmit diversity is provided. For example, for transmit diversity with feedback, pilots from multiple transmit antennas could be used to compute composite channel estimates. For soft handover, weight solutions could be computed separately, and used to select from a merged set of candidate delays. Alternatively, a joint SNR metric could be used. For transmit diversity using an Alamouti code, the same finger selection could be used for both transmitted signals. For multiple input, multiple output (MIMO) applications, delay selection may be separately performed for each signal, or an approach that maximizes minimum SNR could be used.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed:

1. In a spread spectrum communications receiver, a method of recovering a signal from a composite signal, including signals from one or more sources, the method comprising:
   determining channel and correlation characteristics for the composite signal;
   determining respective combining weights for information from the composite signal for respective ones of a plurality of candidate delays based on the determined channel and correlation characteristics;
   selecting a group of delays from the plurality of candidate delays based on the determined combining weights; and
   processing information from the composite signal for the selected delays according to a spreading code to generate a symbol estimate.

2. A method according to claim 1, wherein selecting a group of delays from the plurality of candidate delays based on the determined combining weights comprises selecting a group of delays having greatest corresponding combining weights.

3. A method according to claim 2:
   wherein determining channel and correlation characteristics comprises identifying a time-domain channel response and quantity correlation; and
   wherein determining respective combining weights comprises determining the respective combining weights from the time-domain channel response and quantity correlation.

4. A method according to claim 3, wherein the quantity correlation comprised a noise covariance.

5. A method according to claim 2:
   wherein determining channel and correlation characteristics comprises determining a weight frequency response including noise information; and
   wherein determining respective combining weights comprises determining the respective combining weights from the weight frequency response.

6. A method according to claim 5, wherein determining a weight frequency response comprises:
   determining a channel frequency response;
   determining a white noise variance and an aggregate signal energy for the one or more sources; and
   determining the weight frequency response from the channel frequency response, the white noise variance and the aggregate signal energy.

7. A method according to claim 5:
   wherein determining the respective combining weights from the weight frequency response comprises converting the weight frequency response to a time-domain weight model comprising a plurality of signal taps and corresponding coefficients; and
   wherein selecting a group of delays from the plurality of candidate delays based on the determined combining weights comprises selecting a group of signal taps from the plurality of signal taps based on the coefficients.

8. A method according to claim 1, wherein selecting a group of delays from the plurality of candidate delays based on the determined combining weights comprises:
   selecting a first delay for inclusion in the group of delays;

generating a signal and noise content estimate for a second delay from a weight associated with the first delay; and selecting the second delay for inclusion in the group of delays based on the generated signal and noise content estimate.

9. A method according to claim 8, wherein generating a signal and noise content estimate comprises:
   determining a correlation between composite signal information for the first delay and composite signal information for the second delay; and
   generating the signal and noise content estimate for the second delay from the correlation and the weight associated with the first delay.

10. A method according to claim 9, wherein generating a signal and noise content estimate from the correlation and the weight associated with the first delay comprises generating the signal and noise content estimate without inverting a noise covariance matrix.

11. A method according to claim 8:
   wherein generating a signal and noise content estimate for a second delay from a weight associated with the first delay comprises generating respective signal and noise content estimates for respective ones of the plurality of second delays from the weight associated with the first delay; and
   wherein selecting the second delay for inclusion in the group of delays based on the generated signal and noise content estimate comprises selecting from among the plurality of second delays based on the signal and noise content estimates.

12. A method according to claim 11, wherein selecting from among the plurality of second delays based on the signal and noise content estimates comprises selecting second delays whose associated signal and noise content estimates indicate a greatest improvement of signal to noise ratio.

13. A method according to claim 11:
   wherein selecting from among the plurality of second delays based on the signal and noise content estimates comprises selecting a first one of the second delays;
   wherein determining respective combining weights for information from the composite signal for respective ones of a plurality of candidate delays based on the determined channel and correlation characteristics comprises determining new respective combining weights for respective ones of the selected group of delays including the selected first one of the second delays;
   wherein generating respective signal and noise content estimates for respective ones of the plurality of second delays from the weight associated with the first delay comprises generating new signal and noise content estimates for respective ones of the plurality of second delays not yet selected; and
   wherein selecting from among the plurality of second delays based on the signal and noise content estimates comprises selecting a second one of the second delays based on the new signal and noise content estimates.

14. A method according to claim 13, wherein selecting a second one of the second delays based on the new signal and noise content estimates comprises substituting the second one of the second delays for a previously selected one of the selected group of delays based on a comparison of signal and noise content estimates.

15. A method according to claim 11, wherein selecting from among the plurality of second delays based on the signal and noise content estimates comprises:
   generating an aggregate signal and noise content estimate for a set of the second delays; and
   determining whether to select the set of second delays for inclusion in the group of selected delays based on the aggregate signal and noise content estimate.

16. A method according to claim 1, wherein processing information from the composite signal for the selected delays according to a spreading code to generate a symbol estimate comprises:
   generating respective correlations of the composite signal with the spreading code for respective ones of the selected delays; and
   combining the generated correlations to generate the symbol estimate.

17. A method according to claim 1, wherein processing information from the composite signal for the selected delays according to a spreading code to generate a symbol estimate comprises:
   filtering the composite signal using a filter having filter taps corresponding to respective ones of the selected delays; and
   correlating the filtered composite signal with the spreading code to generate the symbol estimate.

18. A method according to claim 1 wherein determining channel and correlation characteristics for the composite signal comprises determining the correlation characteristic parametrically and/or non-parametrically.

19. A method according to claim 1, wherein determining channel and correlation characteristics for the composite signal comprises determining the correlation characteristic from correlations of the composite signal at the plurality of candidate delays.

20. In a spread spectrum communications receiver, a method of recovering a signal from a composite signal including signals from one or more sources, the method comprising:
   determining channel and correlation characteristics for the composite signal;
   determining respective combining weights for information from the composite signal for respective ones of a plurality of candidate delays based on the determined channel and correlation characteristics;
   selecting a group of delays from the plurality of candidate delays that have combining weights meeting a predetermined criterion; and
   processing information from the composite signal for the selected group of delays according to a spreading code to generate a symbol estimate.

21. A method according to claim 20, wherein selecting a group of delays from the plurality of candidate delays that have combining weights meeting a predetermined criterion comprises selecting a group of delays having greatest corresponding combining weights.

22. A method according to claim 21:
   wherein determining channel and correlation characteristics comprises identifying a time-domain channel response and quantity correlation; and
   wherein determining respective combining weights comprises determining the respective combining weights from the time-domain channel response and quantity correlation.

23. A method according to claim 22, wherein the quantity correlation comprises a noise covariance.

24. A method according to claim 20:
   wherein determining channel and correlation characteristics comprises determining a weight frequency response including noise information; and
   wherein determining respective combining weights comprises determining the respective combining weights from the weight frequency response.

25. A method according to claim 24, wherein determining a weight frequency response comprises:
   determining a channel frequency response;
   determining a white noise variance and an aggregate signal energy for the one or more sources; and
   determining the weight frequency response from the channel frequency response, the white noise variance and the aggregate signal energy.

26. A method according to claim 24:
   wherein determining the respective combining weights from the weight frequency response comprises converting the weight frequency response to a time-domain weight model comprising a plurality of signal taps and corresponding coefficients; and
   wherein selecting a group of delays from the plurality of candidate delays based on the determined combining weights comprises selecting a group of signal taps from the plurality of signal taps based on the coefficients.

27. In a spread spectrum communications receiver, a method of recovering a signal from a composite signal including signals from one or more sources, the method comprising:
   determining channel and correlation characteristics for the composite signal;
   determining respective combining weights for information from the composite signal for respective ones of a plurality of candidate delays based on the determined channel and correlation characteristics;
   selecting a first delay for a group of delays;
   generating a signal and noise content estimate for a second delay from a weight associated with the first delay; and
   selecting the second delay for inclusion in the group of delays based on the generated signal and noise content estimate; and
   processing information from the composite signal for the selected first and second delays according to a spreading code to generate a symbol estimate.

28. A method according to claim 27, wherein generating a signal and noise content estimate comprises:
   determining a correlation between composite signal information for the first delay and composite signal information for the second delay; and
   generating the signal and noise content estimate for the second delay from the correlation and the weight associated with the first delay.

29. A method according to claim 28, wherein generating a signal and noise content estimate from the correlation and the weight associated with the first delay comprises generating the signal and noise content estimate without inverting a noise covariance matrix.

30. A method according to claim 27:
   wherein generating a signal and noise content estimate for a second delay from a weight associated with the first delay comprises generating respective signal and noise content estimates for respective ones of a plurality of second delays from the weight associated with the first delay; and
   wherein selecting the second delay for inclusion in the group of delays based on the generated signal and noise content estimate comprises selecting from among the plurality of second delays based on the signal and noise content estimates.

31. A method according to claim 30, wherein selecting from among the plurality of second delays based on the signal and noise content estimates comprises selecting second delays whose associated signal and noise content estimates indicate a greatest improvement of signal to noise ratio.

32. A method according to claim 30:
   wherein selecting from among the plurality of second delays based on the signal and noise content estimates comprises selecting a first one of the second delays;
   wherein determining respective combining weights for information from the composite signal for respective ones of a plurality of candidate delays based on the determined channel and correlation characteristics comprises determining new respective combining weights for respective ones of the selected group of delays including the selected first one of the second delays;
   wherein generating respective signal and noise content estimates for respective ones of the plurality of second delays from the weight associated with the first delay comprises comprises a noise covariance. generating new signal and noise content estimates for respective ones of the plurality of second delays not yet selected; and
   wherein selecting from among the plurality of second delays based on the signal and noise content estimates comprises selecting a second one of the second delays based on the new signal and noise content estimates.

33. A method according to claim 32, wherein selecting a second one of the second delays based on the new signal and noise content estimates comprises substituting the second one of the second delays for a previously selected one of the selected group of delays based on a comparison of signal and noise content estimates.

34. A method according to claim 30, wherein selecting from among the plurality of second delays based on the signal and noise content estimates comprises:
   generating an aggregate signal and noise content estimate for a set of the second delays; and
   determining whether to select the set of second delays for inclusion in the group of selected delays based on the aggregate signal and noise content estimate.

35. A spread spectrum communications receiver comprising:
   a radio processor configured to receive a radio signal including signals from one or more sources and to produce a composite baseband signal including signals from one or more sources; and
   a baseband processor configured to determine channel and correlation characteristics for the composite signal, to determine respective combining weights for information from the composite signal for respective ones of a plurality of candidate delays based on the determined channel and correlation characteristics, to select a group of delays from the plurality of candidate delays based on the determined combining weights, and to process information from the composite signal for the selected delays according to a spreading code to generate a symbol estimate.

36. A receiver according to claim 35, wherein the baseband processor is operative to select a group of delays having greatest corresponding combining weights.

37. A receiver according to claim 36, wherein the baseband processor is operative to identify a time-domain channel response and quantity correlation and to determine the respective combining weights from the time-domain channel response and quantity correlation.

38. A receiver according to claim 37, wherein the quantity correlation comprises a noise covariance 39. A receiver according to claim 36, wherein the baseband processor is operative to determine a weight frequency response including noise information and to determine the respective combining weights from the weight frequency response.

40. A receiver according to claim 35, wherein the baseband processor is operative to generate a signal and noise content estimate for a second delay from a weight associated with a first delay and to select the second delay for inclusion in the group of delays based on the generated signal and noise content estimate.

41. A receiver according to claim 40, wherein the baseband processor is operative to generate an aggregate signal and noise content estimate for a set of the second delays, and to determine whether to select the set of second delays for inclusion in the group of selected delays based on the aggregate signal and noise content estimate.

42. A receiver according to claim 35, wherein the baseband processor is operative to generate respective correlations of the composite signal with the spreading code for respective ones of the selected delays, and to combine the generated correlations to generate the symbol estimate.

43. A receiver according to claim 35, wherein the baseband processor is operative to filter the composite signal using a filter having filter taps corresponding to respective ones of the selected delays and to correlate the filtered composite signal with the spreading code to generate the symbol estimate.

* * * * *

UNITED STATES PATENT AND TRADEMARK OFFICE
CERTIFICATE OF CORRECTION

PATENT NO.        : 7,769,078 B2
APPLICATION NO.   : 10/959923
DATED             : August 3, 2010
INVENTOR(S)       : Cairns et al.

It is certified that error appears in the above-identified patent and that said Letters Patent is hereby corrected as shown below:

In Column 11, Line 46, delete " $\tilde{\gamma}\tilde{w}'$ " and insert -- $\tilde{\gamma}'$ --, therefor.

In Column 14, Line 39, delete " $H^*_{TX}(\omega))H^*_c(\omega)$ ," and insert -- $H^*_{TX}(\omega)H^*_c(\omega)$ --, therefor.

In Column 14, Line 52, after "filed", insert -- concurrently --.

In Column 20, Line 15, in Claim 32, delete "comprises a noise covariance." before "generating".

In Column 20, Line 62, in Claim 38, delete "covariance" and insert -- covariance. --, therefor.

Signed and Sealed this
First Day of February, 2011

David J. Kappos
*Director of the United States Patent and Trademark Office*